(12) United States Patent
Matsumura et al.

(10) Patent No.: US 10,185,188 B2
(45) Date of Patent: Jan. 22, 2019

(54) LIQUID CRYSTAL DISPLAY DEVICE

(71) Applicant: SHARP KABUSHIKI KAISHA, Sakai, Osaka (JP)

(72) Inventors: Satoshi Matsumura, Sakai (JP); Yosuke Iwata, Sakai (JP); Mitsuhiro Murata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/557,711

(22) PCT Filed: Mar. 4, 2016

(86) PCT No.: PCT/JP2016/056726
§ 371 (c)(1),
(2) Date: Sep. 12, 2017

(87) PCT Pub. No.: WO2016/143686
PCT Pub. Date: Sep. 15, 2016

(65) Prior Publication Data
US 2018/0046039 A1 Feb. 15, 2018

(30) Foreign Application Priority Data

Mar. 12, 2015 (JP) ................. 2015-049712

(51) Int. Cl.
*G02F 1/137* (2006.01)
*G02F 1/1343* (2006.01)
*G02F 1/1368* (2006.01)

(52) U.S. Cl.
CPC ........ *G02F 1/134309* (2013.01); *G02F 1/137* (2013.01); *G02F 1/1368* (2013.01);
(Continued)

(58) Field of Classification Search
CPC ......... G02F 1/134309; G02F 1/134363; G02F 1/1368
(Continued)

(56) References Cited

U.S. PATENT DOCUMENTS

2002/0021396 A1* 2/2002 Yoo .................. G02F 1/133707
349/141
2002/0041354 A1 4/2002 Noh et al.
(Continued)

FOREIGN PATENT DOCUMENTS

JP 2002-182230 A 6/2002

*Primary Examiner* — Lucy P Chien
(74) *Attorney, Agent, or Firm* — ScienBiziP, P.C.

(57) ABSTRACT

The liquid crystal display device of the present invention includes: upper and lower substrates; and a horizontal alignment type liquid crystal layer, the lower substrate including electrodes, the electrodes including a first electrode, a second electrode present in a different layer from the first electrode, and a third electrode present in a different layer from the first electrode, the first electrode including a plurality of linear sections, the second electrode and the third electrode constituting a pair of comb electrodes, each of the comb electrodes including a trunk part and a plurality of branch parts diverging from the trunk part, at least one of the plurality of branch parts of the third electrode including a protruding part that makes the branch part partially wide, between two intersections with a plurality of linear sections of the first electrode in a plan view of the lower substrate.

11 Claims, 17 Drawing Sheets

(52) U.S. Cl.
 CPC .............. *G02F 1/134363* (2013.01); *G02F 2001/13706* (2013.01); *G02F 2001/134345* (2013.01); *G02F 2201/122* (2013.01); *G02F 2201/124* (2013.01); *G02F 2202/10* (2013.01)

(58) Field of Classification Search
 USPC .......................................................... 349/42
 See application file for complete search history.

(56) References Cited

U.S. PATENT DOCUMENTS

| | | | | |
|---|---|---|---|---|
| 2003/0086044 | A1* | 5/2003 | Inoue | G02F 1/133753 |
| | | | | 349/141 |
| 2009/0224245 | A1* | 9/2009 | Umezaki | G09G 3/3677 |
| | | | | 257/59 |
| 2013/0033666 | A1* | 2/2013 | Chung | G02F 1/133707 |
| | | | | 349/126 |

\* cited by examiner

Initial azimuth of liquid crystal

Region 1

Region 2

Initial azimuth of liquid crystal (i) 0V (ii) 1V/−1V (iii) −1V/1V

— Upper layer electrode (i) voltage value
----- Lower layer electrode (ii) voltage value
·········· Lower layer electrode (iii) voltage value Initial azimuth of liquid crystal (i)5V/-5V
(ii)0V
(iii)0V Initial azimuth
of liquid crystal Initial azimuth
of liquid crystal

LIQUID CRYSTAL DISPLAY DEVICE

TECHNICAL FIELD

The present invention relates to a liquid crystal display device. More specifically, the present invention relates to a liquid crystal display device that performs display by utilizing an electric field generated by a plurality of electrodes.

BACKGROUND ART

A liquid crystal display device is composed of a liquid crystal display element interposed between a pair of glass substrates, for example. Owing to the characteristics such as being thin, lightweight, and low in power consumption, such liquid crystal display devices are used in products such as car navigation devices, electronic books, photo frames, industrial equipment, televisions, personal computers, smartphones, and tablet terminals, and have become indispensable for everyday life and business. In these applications, investigations have been made on liquid crystal display devices of various modes pertaining to electrode arrangement and substrate design to vary optical characteristics of a liquid crystal layer.

Recent display systems of liquid crystal display devices include a vertical alignment (VA) mode such as a multi-domain vertical alignment (MVA) mode, in which liquid crystal molecules having negative anisotropy of dielectric constant are aligned perpendicularly to substrate surfaces; and an in-plane switching (IPS) mode and fringe field switching (FFS) mode in each of which liquid crystal molecules having positive or negative anisotropy of dielectric constant are aligned in parallel with the substrate surface and a transverse electric field is applied to a liquid crystal layer.

In particular, the FFS mode is a liquid crystal mode that is used widely in recent years for smartphones and tablet terminals. As the FFS mode liquid crystal display device, for example, there is disclosed (see, for example, Patent Literature 1) an FFS mode liquid crystal display device comprising: a first and a second transparent insulating substrates arranged opposite to each other with a predetermined distance, with a liquid crystal layer including a plurality of liquid crystal molecules interposed between them; a plurality of gate bus lines and data bus lines formed on the first transparent insulating substrate and arranged in a matrix form to define a unit pixel; a thin-film transistor formed at an intersection of the gate bus line and the data bus line; a counter electrode disposed in each unit pixel, made of transparent conductor; and a pixel electrode arranged in each unit pixel to generate a fringe field together with the counter electrode, being insulated with the counter electrode and made of transparent conductor and including a plurality of upper slits and lower slits symmetrical each other with respect to long side of the pixel with a predetermined tilted angle.

CITATION LIST

Patent Literature

Patent Literature 1: JP 2002-182230 A

SUMMARY OF INVENTION

Technical Problem

An FFS mode liquid crystal display device described in Patent Literature 1 is disclosed to have wide viewing angle characteristics and increase the aperture ratio and transmittance which are low in the IPS mode liquid crystal display device (for example, see FIG. 6 in Patent Literature 1; FIG. 6 in Patent Literature 1 shows a planar pixel structure of the FFS mode liquid crystal display device). However, even though the FFS mode liquid crystal display device described in Patent Literature 1 can forcibly make the liquid crystal respond by utilizing generated electric fields in rise time (a time interval needed for a display state to change from a dark state (black display) to a bright state (white display)), the liquid crystal in decay time (a time interval needed for the display state to change from a bright state (white display) to a dark state (black display)) is made to respond by the viscoelasticity thereof with no more electric fields generated, resulting in a slower response compared to the vertical alignment mode. Thus, the FFS mode liquid crystal display device of Patent Literature 1 can still be improved in terms of the response characteristics.

One example of the FFS mode liquid crystal display device described in Patent Literature 1 will be described using FIG. 13. FIG. 13 is a cross-sectional schematic view of a liquid crystal display device having a conventional FFS mode electrode structure. FIG. 13 shows a structure of a liquid crystal display device wherein, in a lower substrate 1010, there are arranged an upper layer electrode (iv) provided with slits and a planar lower layer electrode (v) with an insulating layer 1013 in between. The liquid crystal display device may be one that, in rise time, makes the liquid crystal respond by applying a certain voltage to the upper Paver electrode (iv) (the certain voltage may, for example, be such that a voltage difference between the upper layer electrode (iv) and the lower layer electrode (v) becomes equal to a threshold voltage or more to generate a fringe electric field forcing the liquid crystal to respond; in the present description, the threshold voltage refers to a voltage value that provides a transmittance of 5% when the transmittance in the bright state is set at 100%) and, in decay time, lets the liquid crystal respond by setting a potential difference between the upper layer electrode (iv) and the lower layer electrode (v) to a value less than the threshold value and stopping (weakening) the fringe electric field.

In a conventional FFS mode liquid crystal display device, switching in rise time is performed, as described above, by generating a fringe electric field between FFS electrodes on the lower substrate and rotating liquid crystal molecules near the lower substrate in the same direction in a horizontal plane. Further, switching in decay time is performed by eliminating the fringe electric field and thereby returning the liquid crystal molecules to their original alignment state by the viscoelasticity thereof.

However, a conventional FFS mode liquid crystal display device has, in the liquid crystal layer, an area where the electric field for rotating the liquid crystal molecules is weak and thus the liquid crystal molecules in that area take time to rotate. Further, because the liquid crystal molecules rotate in the same direction at this time, strain due to elastic deformation of the liquid crystal in the horizontal plane is small. Therefore, when performing switching in decay time by stopping the electric field, restoring force from elastic deformation that works on the liquid crystal molecules to return them to the original alignment state is small, resulting in a slow response. Therefore, response times in both switching in rise time and switching in decay time are long.

Here, the present inventors conducted various studies on a liquid crystal display device that performs display by utilizing an electric field generated by a plurality of electrodes, and focused on an electrode structure on the lower substrate. As a result, while a conventional FFS mode liquid crystal display device has a lower substrate composed of two-layered electrodes to which two different voltages can be applied, the inventors designed the lower substrate to be composed of two-layered electrodes to which three different voltages can be applied, including a pair of comb electrodes. Further, the present inventors have found that, in such a liquid crystal display device, a fast response can be achieved in addition to a wide viewing angle (for example, driving [first drive system] that makes the response faster than the FFS mode described later in Comparative Example 2). Here, such driving (first drive system) of the liquid crystal display device where the response becomes faster than the FFS mode can still be improved in terms of the contrast ratio by preventing black floating (a phenomenon where transmittance does not drop sufficiently in a black display state) which occurs due to constant voltage application to the lower layer electrode of the lower substrate. In order to prevent the black floating, it is conceivable to reduce the voltage value of the lower layer electrode. However, when the voltage value of the lower layer electrode is reduced, the alignment of the liquid crystal molecules may become unstable. Thus, improvements can be made to achieve the intended alignment.

The present invention was made in view of the current situation and aims to provide a liquid crystal display device that achieves a fast response as well as a high contrast ratio and a wide viewing angle.

Solution to Problem

Further, the present inventors decided to form protrusions at some parts of an electrode in a liquid crystal display device wherein the lower substrate is composed of two-layered electrodes to which three different voltages can be applied. The present inventors found that the above problems can be solved by this electrode structure and arrived at the present invention.

That is, one embodiment of the present invention may be a liquid crystal display device including: upper and lower substrates; and a liquid crystal layer interposed between the upper and lower substrates, the lower substrate including electrodes, the electrodes including a first electrode, a second electrode present in a different layer from the first electrode, and a third electrode present in a different layer from the first electrode, the first electrode including a plurality of linear sections, the second electrode and the third electrode constituting a pair of comb electrodes, each of the comb electrodes including a trunk part and a plurality of branch parts diverging from the trunk part, at least one of the plurality of branch parts of the third electrode including a protruding part that makes the branch part wide, between two intersections with a plurality of linear sections of the first electrode in a plan view of the lower substrate, the liquid crystal layer containing liquid crystal molecules that, when no voltage is applied, align in parallel with main surfaces of the upper and lower substrates.

In addition, the liquid crystal display device of the present invention is different from the invention described in Patent Literature 1 in that the lower substrate includes electrodes which are at least two-layered and to which three different voltages can be applied and that one of the electrodes partially includes a protrusion.

The protruding part refers to a section in a portion of the branch part of the third electrode that makes the portion of the branch part wider than other portions of the branch part (a section protruding to at least one side in the short direction of the branch part of the third electrode) in a plan view of the lower substrate.

In the liquid crystal display device of the present invention, at least one of the plurality of branch parts of the third electrode (preferably, each of the plurality of branch parts of the third electrode) may include a protruding part that makes the branch part partially wide, between two intersections with a plurality of linear sections of the first electrode in a plan view of the lower substrate.

A preferable shape of the third electrode in a plan view of the lower substrate will be described in the following. The protruding part preferably protrudes on both sides in the short direction of the branch part of the third electrode. For example, the protruding part preferably has a symmetrical shape with the branch part of the third electrode as the axis.

The protruding part may have a rectangular shape, a triangular shape, a trapezoidal shape, a semicircular shape, or other shapes. Above all, the protruding part preferably has a rectangular shape or a triangular shape.

The protruding part preferably makes an angle of 20° to 90° with an extending direction of the branch part of the third electrode, more preferably extends in a nearly perpendicular direction.

Further, the extending direction of the linear section of the first electrode and the extending direction of the protruding part of the third electrode preferably make an angle of 0° to 70°.

The branch part of the third electrode preferably contains a cross-shaped section. The cross-shaped section refers to two linear sections that intersect with each other. The two linear sections preferably intersect with each other at a right angle.

The first electrode includes a plurality of linear sections. The first electrode either is provided with a slit or a comb electrode, and an intersecting part of the cross-shaped section of the branch part of the third electrode is preferably arranged at the center of an area surrounded by the first electrode and the second electrode in a plan view of the lower substrate. The intersecting part of the cross-shaped section refers to a section where two linear sections constituting the cross-shaped section intersect with each other. The area surrounded by the first electrode and the second electrode refers to an area surrounded by an outline of the first electrode and/or an outline of the second electrode, which does not superimpose with the first electrode or with the second electrode. The expression "the intersecting part is arranged at the center of the area" means, that the intersecting part is superimposed with the center of the area (for example, a center of gravity when mass is supposed to be uniformly distributed on the area).

Meanwhile, in the present description, the state where the intersecting part of the cross-shaped section of the branch part of the third electrode "is arranged at the center of an area surrounded by the first electrode and the second electrode" is satisfied when, in at least one of the areas surrounded by the first electrode and the second electrode, the intersecting part of the cross-shaped section of the branch part of the third electrode is arranged at the center of the area. The intersecting part of the cross-shaped section of the branch part of the third electrode is preferably arranged at the center of each of the areas surrounded by the first electrode and the second electrode.

The liquid crystal display device of the present invention is preferably configured to perform a first drive operation utilizing an electric field generated by any of the electrodes provided to the lower substrate, the electric field rotating a first group of the liquid crystal molecules in a plane parallel to the main surfaces of the upper and lower substrates and rotating a second group of the liquid crystal molecules in the plane parallel to the main surfaces in a direction opposite to the rotation direction of the first group of the liquid crystal molecules.

The electric field generated by any of the electrodes provided to the lower substrate means an electric field generated by at least one electrode selected from the first electrode, the second electrode, and the third electrode. For example, when the liquid crystal display device is in a power-on state, it is preferable that an electric field is constantly generated between the second electrode and the third electrode and that, in a white display state, the voltage of the first electrode is increased to rotate the liquid crystal molecules and, in a black display state, the voltage of the first electrode is reduced to rotate the liquid crystal molecules in an opposite direction.

In the liquid crystal display device of the present invention, the first drive operation preferably utilizes an electric field generated by any of the electrodes provided to the lower substrate, the electric field rotating the liquid crystal molecules in a sub-pixel so that first and second regions are formed alternately, the first region containing the first group of the liquid crystal molecules rotated in the plane parallel to the main surfaces, the second region containing the second group of the liquid crystal molecules rotated in the plane parallel to the main surfaces in the direction opposite to the rotation direction of the first group of the liquid crystal molecules.

The first group of the liquid crystal molecules means some liquid crystal molecules among the liquid crystal molecules contained in a liquid crystal layer. The second group of the liquid crystal molecules likewise means some liquid crystal molecules among the liquid crystal molecules contained in the liquid crystal layer other than the first group of liquid crystal molecules.

The liquid crystal display device of the present invention is preferably configured to switch between a first drive system that performs the first drive operation and a second drive system that performs a second drive operation utilizing an electric field generated by any of the electrodes, the electric field rotating the liquid crystal molecules in the plane parallel to the main surfaces of the upper and lower substrates in one direction.

In the liquid crystal display device of the present invention, usually, the first electrode, the second electrode, and the third electrode are electrically separated from each other, and voltages of these can be controlled individually. In other words, usually, the first electrode, the second electrode, and the third electrode can be set to different voltages that are not less than the threshold voltage.

In the liquid crystal display device of the present invention, the first electrode may be arranged in a different layer from each of the second electrode and the third electrode, but is preferably arranged at a position closer to the liquid crystal layer than the second electrode and the third electrode. Further, the second electrode and the third electrode may be arranged in different layers but are preferably arranged in the same layer. For example, in the liquid crystal display device of the present invention (more preferably, a liquid crystal display device that is driven by a transverse electric field), the electrodes are preferably configured so that the second electrode and the third electrode provided in the same layer of the lower substrate form a pair of comb electrodes, and a slit electrode or a comb electrode is arranged as the first electrode above the second electrode and the third electrode with an insulating layer or the like layer interposed between them. The expression "a pair of comb electrodes are arranged in the same layer" means that each of the comb electrodes is in contact with a common member (for example, an insulating layer, a liquid crystal layer) on the liquid crystal layer side and/or on the side opposite to the liquid crystal layer side thereof.

In the liquid crystal display device of the present invention, it is preferable that the liquid crystal display device is driven by applying a voltage to a slit electrode or a comb electrode on the upper layer side, while utilizing a transverse electric field constantly generated between the comb electrodes on the lower layer side (side opposite to the liquid crystal layer) of the two layers of electrodes. A preferable embodiment in the present invention is a liquid crystal display device where, in a liquid crystal mode with horizontal initial alignment, the lower substrate has a two-layered electrode structure, the lower layer electrodes are a pair of comb electrodes, and the upper layer electrode is a slit electrode.

Preferably, the first electrode either is provided with a slit or has a comb shape.

All extending direction of the linear section of the electrode refers to a longitudinal direction of a linear electrode that constitutes the electrode, and an extending direction of the branch part of the electrode refers to a longitudinal direction of a linear electrode that constitutes the branch part of the electrode. In the conventional FFS mode liquid crystal display device, a fringe electric field is generated in rise time by FFS electrodes of the lower substrate and the liquid crystal molecules are rotated only in one direction by the fringe electric field. In contrast, in the liquid crystal display device of the present invention, the lower substrate is composed of two-layered electrodes (the above-mentioned first electrode, second electrode, and third electrode) to which three different voltages can be applied. For example, in rise time, an electric field is generated between the first electrode and the second electrode to rotate liquid crystal molecules in a first region and liquid crystal molecules in a second region in a horizontal plane in directions opposite to each other. Furthermore, in decay time, an electric field is generated between the second electrode and the third electrode to rotate the liquid crystal molecules in the first region and the liquid crystal molecules in the second region in the horizontal plane in the directions opposite to the respective rotation directions in rise time.

The expression "first and second regions are formed alternately" means that first regions and second regions may be alternately formed in a pattern including two or more first regions and two or more second regions, such as a stripe pattern or a staggered pattern.

The first electrode is preferably provided with a slit, and in an area that superimposes with the slit in a plan view of the lower substrate, the liquid crystal display device is preferably configured to perform a drive operation utilizing an electric field generated by any or the electrodes, the electric field rotating a first group of the liquid crystal molecules in a plane parallel to the main surfaces and rotating a second group of the liquid crystal molecules in the plane parallel to the main surface in a direction opposite to the rotation direction of the first group of the liquid crystal molecules.

Meanwhile, in the present description, the expression "in an area that superimposes with the slit, the electric field rotates a first group of the liquid crystal molecules in a plane parallel to the main surfaces and rotates a second group of the liquid crystal molecules in the plane parallel to the main surface in a direction opposite to the rotation direction of the first group of the liquid crystal molecules" means that, in a plan view of the lower substrate, the electric field may be such that, in at least one of the areas that superimpose with and correspond to the respective slits, it rotates a first group of the liquid crystal molecules in a horizontal plane and rotates a second group of the liquid crystal molecules in a horizontal plane in a direction opposite to the rotation direction of the first group of the liquid crystal molecules. However, in a plan view of the lower substrate, the electric field is preferably such that, in each of the areas that superimpose with and correspond to the respective slits, it rotates a first group of the liquid crystal molecules in a horizontal plane, and rotates a second group of the liquid crystal molecules in a horizontal plane in a direction opposite to the rotation direction of the first group of the liquid crystal molecules.

Above all, the first electrode is provided with a slit, and the liquid crystal display device is preferably configured to perform a drive operation utilizing an electric field generated by any of the electrodes, the electric field, in an area that superimposes with the slit provided to the first electrode in a plan view of the lower substrate, rotates a first group of the liquid crystal molecules in a plane parallel to the main surfaces, and rotates a second group of the liquid crystal molecules in the plane parallel to the main surfaces in a direction opposite to the rotation direction of the first group of the liquid crystal molecules and, in an area that superimposes with a range between the combs teeth of the second electrode and the third electrode, rotates the first group of the liquid crystal molecules in the plane parallel to the main surfaces, and the second group of the liquid crystal molecules in the plane parallel to the main surfaces in a direction opposite to the rotation direction of the first group of the liquid crystal molecules.

In the liquid crystal display device of the present invention, electrodes for driving the liquid crystal may or may not be arranged in the upper substrate, but preferable is, for example, one having no electrode arranged. That is, it is one of preferable embodiments of the liquid crystal display device of the present invention that the electrodes for driving the liquid crystal are arranged only in the lower substrate. Further, the shape of the first electrode is not particularly limited but, it is one of preferable embodiments of the present invention that, for example, the first electrode is provided with a slit. Furthermore, it is also one of preferable embodiments of the present invention that the first electrode has a comb shape. In the present description, an electrode having a shape like a comb is not referred to as an electrode provided with a slit but as a comb electrode.

Further, the liquid crystal display device of the present invention is preferably one configured to switch between a first drive system that performs the first drive operation and a second drive system that performs a drive operation utilizing an electric field generated by any of the above electrodes, the electric field rotating the liquid crystal molecules in the plane parallel to the main surfaces of the upper and lower substrates in one direction. Here, "rotating the liquid crystal molecules in one direction" may be "rotating the liquid crystal molecules substantially in one direction." Furthermore, "an electric field generated by any of the electrodes" may be an electric field generated by at least one electrode selected from the first electrode, the second electrode, and the third electrode. For example, it is preferable to apply, in a white display state, a voltage to the first electrode to generate an electric field to rotate the liquid crystal molecules and to reduce, in a black display state, the voltage applied to the first electrode to weaken or zero the electric field to rotate the liquid crystal molecules in an opposite direction.

The configuration of the liquid crystal display device of the present invention is not particularly limited by other components, but other configuration usually used for the liquid crystal display device can be applied suitably.

Advantageous Effects of Invention

According to the liquid crystal display device of the present invention, a fast response as well as a high contrast ratio and a wide viewing angle are achieved.

DESCRIPTION OF EMBODIMENTS

Figure 1:
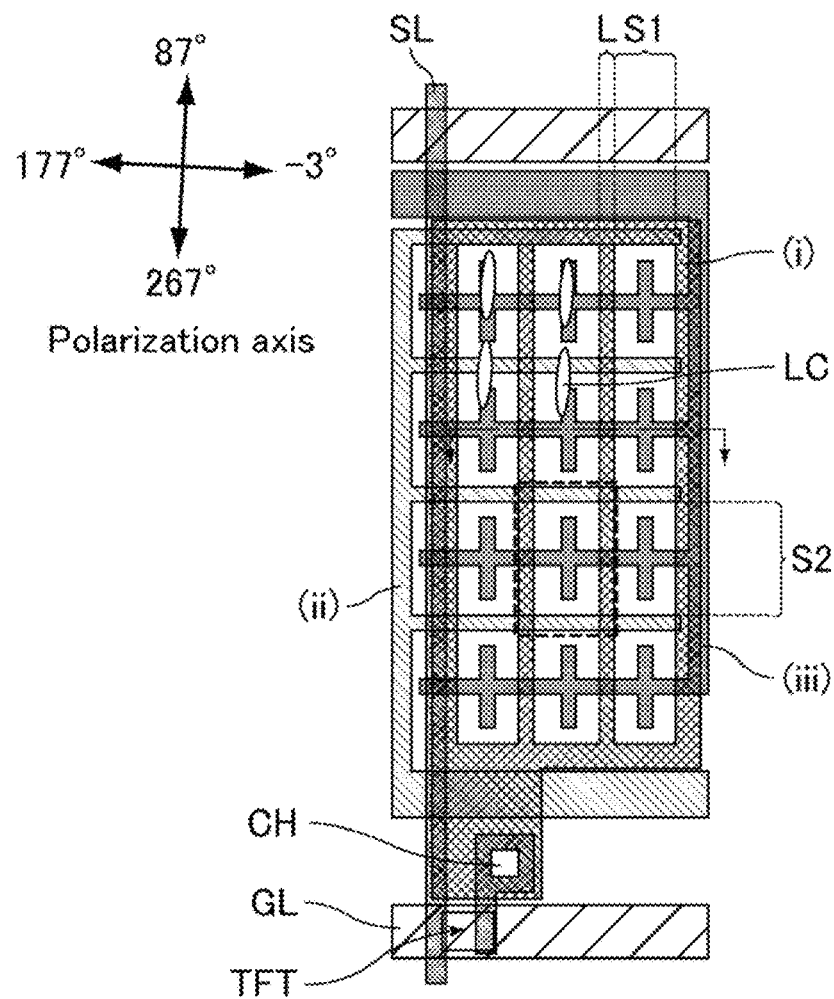
FIG. 1 is a plan schematic view showing an electrode structure of a pixel and initial alignment of liquid crystal molecules of a liquid crystal display device of Embodiment 1.

In the following, embodiments are provided and the present invention will be described in more detail with reference to the drawings. However, the present invention is not limited to these embodiments. In the present description, the term "pixel" may refer to "sub-pixel" unless particularly specified. The term "sub-pixel" refers to an area that shows any single color such as, for example, red (R), green (G), blue (B), or yellow (Y). Further, a pair of substrates having a liquid crystal layer interposed between them is also referred to as "upper and lower substrates," of which the substrate on the display surface side is also referred to as an "upper substrate" and a substrate on the side opposite to the display surface is also referred to as a "lower substrate." Furthermore, among the electrodes arranged on the substrate, an electrode on the display surface side is also referred to as an "upper layer electrode" and an electrode on the side opposite to the display surface side is also referred to as a "lower layer electrode."

Meanwhile, in each embodiment, members and sections that exhibit similar functions are provided with the same reference numerals. Further, in the figures, unless otherwise noted, (i) represents a slit electrode present in the upper layer (liquid crystal layer side) of the lower substrate, (ii) represents a comb electrode present in a lower layer (side opposite to the liquid crystal layer side) of the lower substrate, and (iii) represents another comb electrode present in the lower layer of the lower substrate. In the liquid crystal display device of the present invention, the comb electrode represented by (iii) has a protruding part which is a portion of a branch part diverging from a trunk part, making the branch part partially wide. Even though it is allowable that (i) is arranged in the lower layer (side opposite to the liquid crystal layer side) of the lower substrate and (ii) and (iii) are arranged in the upper layer of the lower substrate to achieve the effect of the present invention, as will be shown in each embodiment, it is preferable that (i) is an upper layer electrode arranged in the upper layer of the lower substrate, and (ii) and (iii) are lower layer electrodes arranged in the lower layer of the lower substrate. Further, (iv) represents an upper layer electrode in an electrode layer having an FFS structure, and (v) represents a lower layer electrode in an electrode layer having an FFS structure. Furthermore, in the figures, layers not related to electric field control for liquid crystal, such as a color filter and a black matrix, are omitted. In the present description, the term "voltage" refers to a potential difference between a given potential and a ground potential.

In the present description, the phrase "electrode of the lower substrate" refers to at least one of the upper layer electrode (i), the lower layer electrode (ii), and the lower layer electrode (iii). Further, the phrase "plan view of the lower substrate" refers to a plan view of the main surface of the lower substrate.

In the present description, the term "slit electrode" refers to an electrode provided with slits, which includes a plurality of linear electrode sections. The slit includes, for example, an area where a linear electrode is not formed.

In the present description, the term "rise time" refers to a time interval during which the display state changes from a dark state (black display) to a bright state (white display). Further, the term "decay time" refers to a time interval during which the display state changes from a bright state (white display) to a dark state (black display). Furthermore, the phrase "initial alignment of liquid crystal" refers to alignment of liquid crystal molecules when no voltage is applied to the liquid crystal layer (in a black display state).

The upper layer electrode (i), the lower layer electrode (ii), and the lower layer electrode (iii) can usually be set to different voltages that are not less than the threshold voltage. The state where the electrodes are "set to different voltages that are not less than the threshold voltage" may be one where the liquid crystal display device can perform a drive operation to set the electrodes to different voltages that are not less than the threshold voltage, and thereby it becomes possible to appropriately control the electric field generated in the liquid crystal layer. A configuration that enables application of different voltages includes the following. For example, when the upper layer electrode (i) is a pixel electrode and the lower layer electrode (ii) and the lower layer electrode (iii) are common electrodes, a thin-film transistor element (TFT) is connected to the upper layer electrode (i), and the liquid crystal is driven by an alternating current (AC-driven) by varying the voltage values and applying an alternating current voltage (AC voltage). At the same time, an alternating-current voltage may be applied to the lower layer electrode (ii) and the lower layer electrode (iii) by a different TFT to have the liquid crystal driven by an alternating current; an alternating current voltage may be applied to the lower layer electrode (ii) and the lower layer electrode (iii) that are commonly connected in each line or commonly connected in all the pixels by a TFT that corresponds to the line or all the pixels to have the liquid crystal driven by an alternating current; or a direct current voltage (DC voltage) may be applied to the lower layer electrode (ii) and the lower layer electrode (iii) without using a TFT to have the liquid crystal driven by a direct current (DC-driven).

Embodiment 1

FIG. 1 is a plan schematic view showing an electrode structure of a pixel of a liquid crystal display device of Embodiment 1 and initial alignment of liquid crystal molecules.

In Embodiment 1, two linear polarizing plates having a polarization axis shown in FIG. 1 are used. In Embodiment 1, one linear polarizing plate is arranged on the outside (side opposite to the liquid crystal layer side) of each of the upper and lower substrates. As for arrangement of the linear polarizing plates, there was employed a crossed Nicols arrangement where the polarization axes of the linear polarizing plates on the upper and lower substrates are each vertical or parallel to the long axes of the liquid crystal molecules (an azimuth of initial alignment of the liquid crystal molecules) under no application of voltage to form a liquid crystal display device of a normally black mode. In this way, it is preferable that each of the upper and lower substrates has a linear polarizing plate.

The upper layer electrode (i) contains a plurality of linear sections in a plan view of the lower substrate. The plurality of linear sections are nearly parallel to each other, and between the linear sections, there are formed slits that are nearly parallel to each other. In this way, it is one of preferable embodiments of the present invention that the upper layer electrode (i) is provided with slits (being a slit electrode). In addition, the upper layer electrode (i) may be a comb electrode instead of being a slit electrode. It is one of preferable embodiments of the present invention that the upper layer electrode (i) has a comb shape.

The lower layer electrode (ii) and the lower layer electrode (iii) are, in a plan view of the lower substrate, each composed of a trunk part and branch parts extending from the trunk part. The branch parts are a plurality of linear electrode sections that are nearly parallel to each other. In this way, it is one of preferable embodiments of present invention that the lower layer electrode (ii) and the lower layer electrode (iii) each have a comb shape.

As described above, the upper layer electrode (i), the lower layer electrode (ii), and the lower layer electrode (iii) each preferably have linear sections.

The structures of the upper layer electrode (i), the lower layer electrode (ii), and the lower layer electrode (iii) shown in FIG. 1 are only one example and are not limited to these shapes, and electrodes of various structures can be used.

The extending direction of the branch parts of each of the lower layer electrode (ii) and the lower layer electrode (iii) is set to make an angle of 90° with the extending direction of the linear sections of the upper layer electrode (i). In other words, the two comb electrodes possessed by the lower substrate are arranged so that the extending directions of the linear sections, that are branch parts of the comb electrodes, each intersect the extending direction of the linear sections of the upper layer electrode (i) at an angle of 90°. The angle is preferably 30° or more and 90° or less, more preferably 45° or more, even more preferably 60° or more, especially preferably 75° or more. By such an electrode structure, response times in rise time and in decay time can be made shorter.

Further, in FIG. 1, the linear sections (branch parts) possessed by the lower layer electrode (ii) of the lower substrate are each arranged between the linear sections (branch parts) possessed by the lower layer electrode (iii).

The electrodes of each layer (the upper layer electrode (i), the lower layer electrode (ii), and the lower layer electrode (iii)) are arranged in a positional relationship shown in FIG. 1. In this way, it is one of preferable embodiments of the present invention that the upper layer electrode (i) of the lower substrate is provided with slits and the lower layer electrode (ii) and the lower layer electrode (iii) of the lower substrate each have a comb shape. Furthermore, is also one of preferable embodiments of the present invention that the upper layer electrode (i), the lower layer electrode (ii), and the lower layer electrode (iii) each have a comb shape.

The upper layer electrode is electrically connected to a drain electrode that extends from a thin-film transistor element TFT via a contact hole CH. At a timing selected by a gate bus line GL, a voltage supplied by a source driver via a source bus line SL is applied to the upper layer electrode (i) that drives the liquid crystal through the thin-film transistor element TFT.

In the upper layer electrode (i), an electrode width L of each linear section is 3 μm, and an electrode space S1 between the neighboring linear sections is 6 μm. The electrode width L is preferably, for example, 2 μm or more and 7 μm or less. Further, the electrode space S1 is preferably, for example, 2 μm or more and 14 μm or less. A ratio (L/S1) of the electrode width L to the electrode space S1 is preferably 0.1 to 1.5. The lower limit of the ratio L/S is more preferably 0.2 and the upper limit thereof is more preferably 0.8.

Figure 3:
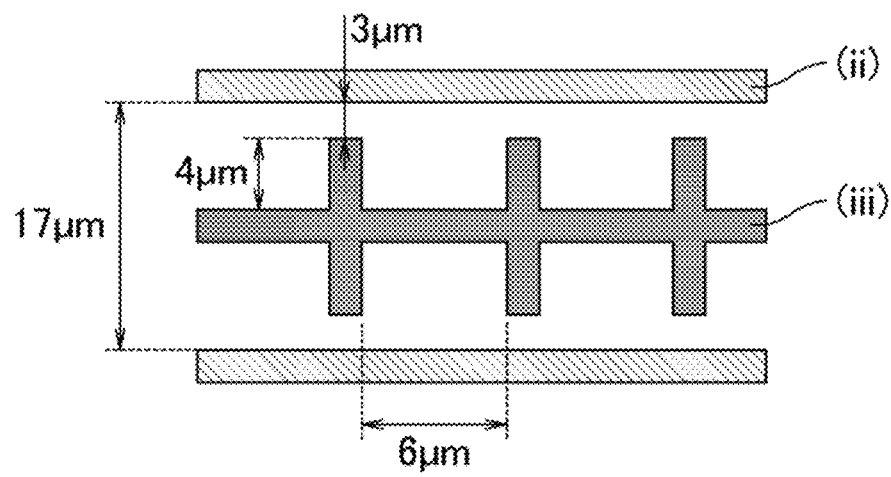
FIG. 3 is a schematic view showing a lower layer electrode (ii) and a lower layer electrode (iii) of Embodiment 1.

FIG. 3 is a schematic view showing the lower layer electrode (ii) and the lower layer electrode (iii) of Embodiment 1.

In FIG. 3, the widths of the branch parts (excluding the sections where protruding parts are formed) of the lower layer electrode (ii) and the lower layer electrode (iii), and the width of the protruding parts are all 3 μm, and other lengths such as an electrode space have values as shown in FIG. 3.

That is, the electrode width of each linear section (branch part) of a pair of comb electrodes composed of the lower layer electrode (ii) and the lower layer electrode (iii) is 3 μm and the electrode space between the linear section in the lower layer electrode (ii) and the linear section in the lower layer electrode (iii) is 7 μm.

The electrode width is preferably 2 μm or more and 7 μm or less. Also, the electrode space is preferably 2 μm or more and 15 μm or less. A ratio of the electrode width to the electrode space is preferably 0.1 to 5.

Further, the branch part of the lower layer electrode (iii) has protruding parts which make the branch part partially wide. The protruding parts (refer to sections of the lower layer electrode (iii) which give the additional widths to the branch part) are each quadrangular (rectangular) and protrude from both sides of the branch part of the lower layer electrode (iii). The length of each protruding part is 4 μm. The space between a tip of each protruding part and the lower layer electrode (ii) is 3 μm. In addition, the space between neighboring protruding parts is 6 μm.

The branch part of the lower layer electrode (iii) contains cross-shaped sections composed together with the protruding parts.

In addition, in the upper layer electrode (i), the electrode widths are usually substantially the same in a pixel. In the case where the electrode widths are different in a pixel, one of the widths is preferably in the above range and all the widths are preferably in the above range. The same applies to the lower layer electrode (ii) and the lower layer electrode (iii). Furthermore, in the upper layer electrode (i), the electrode spaces S1 are substantially the same in a pixel. In the case where the electrode spaces S1 are different in a pixel, one of the spaces S1 is preferably in the above range and all the spaces S1 are preferably in the above range. In the lower layer electrode (ii) and the lower layer electrode (iii), the electrode spaces S2 are substantially the same in a pixel. In the case where the electrode spaces S2 are different in a pixel, one of the spaces S2 is preferably in the above range and all the spaces S2 are preferably in the above range.

Figure 2:
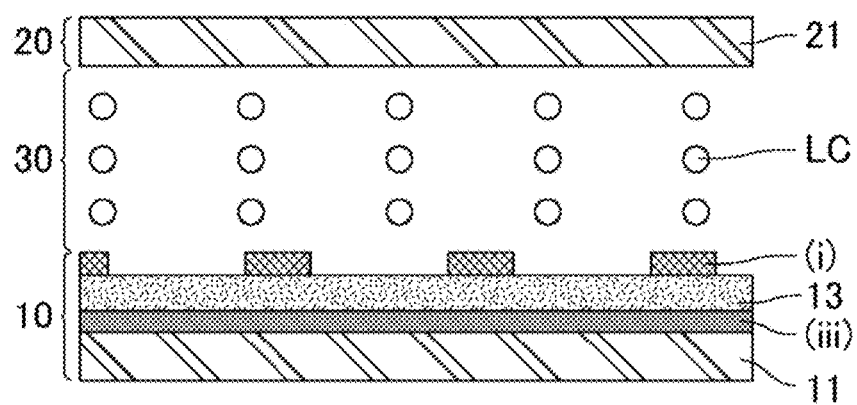
FIG. 2 is a cross-sectional schematic view showing a cross-section of a section corresponding to a line segment shown by an alternate long and short dash lime in FIG. 1.

FIG. 2 is a cross-sectional schematic view showing a cross-section of section corresponding to the line segment shown by an alternate long and short dash line in FIG. 1.

The liquid crystal display device of Embodiment 1 is, as shown in FIG. 2, composed by stacking a lower substrate 10, a liquid crystal layer 30, and an upper substrate 20 in this order from the back surface side to the observation surface side of the liquid crystal display device.

In the liquid crystal display device of Embodiment 1, as shown in FIG. 2, the liquid crystal molecules LC are horizontally aligned (aligned parallel to the main surfaces of the and lower substrates) when potential differences between the electrodes possessed by the lower and upper substrates are less than the threshold voltage. In FIG. 2, the liquid crystal molecules LC are aligned roughly from the depth of the drawing toward the front side.

The lower layer electrode (ii) (not shown in FIG. 2) and the lower layer electrode (iii) of the lower substrate 10 are each a comb electrode as mentioned above, and the upper layer electrode (i) that is a slit electrode is arranged on the lower layer electrode (ii) and the lower layer electrode (iii) with an insulating layer 13 interposed between them. The electrodes for driving the liquid crystal are provided not to the upper substrate 20, but only the lower substrate 10. However, the electrodes for driving the liquid crystal may be provided to the upper substrate 20.

The insulating layer 13 has a dielectric constant of 6.9 and an average thickness of 0.3 μm. The insulating layer 13 each is composed of a nitride film SiN, but instead thereof, a material such as an oxide film $SiO_2$ or an acrylic resin or a combination of these materials can be used.

On each of the liquid crystal layer sides of the upper and lower substrates is installed a horizontal alignment film (not illustrated), and the liquid crystal molecules were horizontally aligned in such a way that the long axes of the liquid crystal molecules under no application of voltage are at an azimuth that makes an angle of 3° with the extending direction of the linear sections of the upper layer electrode (i). Meanwhile, the liquid crystal layer and the upper layer electrode (i) abut each other with the horizontal alignment film interposed between them. As the horizontal alignment film, as long as the film aligns the liquid crystal molecules in parallel with the film surface, there may be mentioned: an alignment film formed of an organic material (for example, an alignment film in which the dielectric constant ε=3 to 4); an alignment film formed of an inorganic material (for example, an alignment film in which the dielectric constant ε=5 to 7); a photo alignment film formed of a photoactive material; and an alignment film having been subjected to an alignment treatment by a treatment such as rubbing. In addition, the alignment film may be one that has not been subjected to an alignment treatment by a treatment such as a rubbing treatment. By using an alignment film formed of an organic material, an alignment film formed of an inorganic material, or a photo alignment film that do not require an alignment treatment by a treatment such as a rubbing treatment, it becomes possible to reduce cost by simplifying the process and to improve reliability and yield. Furthermore, when the rubbing treatment is performed, liquid crystal contamination due to mixing of impurities from a rubbing cloth or some other factor, a point-defect failure due to foreign matter, display unevenness in the liquid crystal panel due to uneven rubbing, for example, may occur. However, these disadvantages can be removed by using any of the above alignment trims that do not require alignment treatment by a treatment such as a rubbing treatment.

The liquid crystal contains liquid crystal molecules that align in parallel with the main surfaces of the substrates when there is no voltage applied. The state where the liquid crystal molecules align in parallel with the main surfaces of the substrates means, in the technical field of the present invention, the state where the liquid crystal molecules align substantially in parallel with the main surfaces of the substrates and the liquid crystal molecules may be able to exhibit optical action and effects. It is appropriate that the liquid crystal is one that is substantially composed of liquid crystal molecules that are aligned in parallel with the main surfaces of the substrates when there is no voltage applied. The phrase "when there is no voltage applied" means, in the technical field of present invention, a state that can be regarded as one where voltage is substantially not applied (for example, a voltage less than the threshold voltage of the liquid crystal layer). Such horizontal alignment type liquid crystal is an advantageous system for obtaining characteristics such as a wide viewing angle.

A liquid crystal material in the liquid crystal layer 30 in the liquid crystal display device of Embodiment 1 has positive anisotropy of dielectric constant (anisotropy of dielectric constant $\Delta\varepsilon=5.9$, viscosity (rotational viscosity coefficient) $\gamma 1=89$ cps, refractive index anisotropy $\Delta n=0.109$, and Re of panel=350 nm). In this way, in the liquid crystal display device of the present invention, the liquid crystal molecules preferably have positive anisotropy of dielectric constant. The liquid crystal molecules having positive anisotropy of dielectric constant are aligned in one direction when an electric field is generated, are easily controlled in alignment, and can be more accelerated in response. The anisotropy of dielectric constant $\Delta\varepsilon$ of the liquid crystal is preferably 3 or more, more preferably 4 or more, even more preferably 5 or more. Further, the anisotropy of dielectric constant of the liquid crystal $\Delta\varepsilon$ is preferably 30 or less, more preferably 20 or less, even more preferably 10 or less. In the present description, the anisotropy of dielectric constant $\Delta\varepsilon$ of the liquid crystal means a value measured by an LCR meter.

In Embodiment 1, an average thickness (cell gap) $d_{LC}$ of the liquid crystal layer 30 is 3.2 μm.

In the present description, the average thickness $d_{LC}$ of the liquid crystal layer means a value that is calculated by averaging thicknesses of the whole liquid crystal layer in the liquid crystal display device.

Preferably, $d_{LC} \times \Delta n$ is 100 nm or more, more preferably 150 nm or more, even more preferably 200 nm or more. Further, $d_{LC} \times \Delta n$ is preferably 550 nm or less, more preferably 500 nm or less, even more preferably 450 nm or less.

In Embodiment 1, the lower substrate is provided with two-layered electrodes. In this way, it is one of preferable embodiments in the liquid crystal display device of the present invention that the electrodes possessed by the lower substrate are composed of an electrode provided with slits of the upper layer and a pair of comb electrodes of the lower layer. However, for example, a pair of comb electrodes may be used in the upper layer electrode (i) of the lower substrate instead of the slit electrode. When a pair of comb electrodes are used, the liquid crystal molecules are rotated in a horizontal plane by utilizing a transverse electric field generated between the pair of comb electrodes. The relationship between the alignment direction of the liquid crystal molecules and electrode arrangements may be considered by substituting the extending direction of the linear sections of the slit electrode contained in the FFS electrodes with the extending direction of the branch parts of the pair of comb electrodes.

The upper and lower substrates possessed by the liquid crystal display device of Embodiment 1 are usually a pair of substrates for sandwiching the liquid crystal, are based on insulating substrates such as glass or resin, and are formed by fabricating components such as conductive lines, electrodes, and color filters as necessary on the insulating substrates.

The liquid crystal display device of Embodiment 1 can appropriately be provided with members (for example, a light source) that a usual liquid crystal display device is provided with. Further, the liquid crystal display device of Embodiment 1 is preferably one that drives the liquid crystal by an active matrix drive system. The same holds in the after-mentioned embodiments.

In the following, a method for driving liquid crystal using the liquid crystal display device of the present embodiment will be described.

In the present embodiment, driving that enables a fast response can be achieved. Further, by switching a method for applying a voltage, there can be achieved, by the same configuration, two kinds of driving including driving that enables a fast response and driving that achieves higher transmittance than the former.

In the present description, the driving that can achieve a fast response and the driving that achieves higher transmittance than the former are referred to as a first drive system and a second drive system, respectively.

Both the first drive system and the second drive system perform gray-scale display by varying a voltage of the upper layer electrode (i).

In the first drive system, the liquid crystal is driven by applying a voltage with a reversed polarity to the upper layer electrode (i) according to the gray-scale while constantly generating a transverse electric field by applying a voltage with polarity reversed with an amplitude center set at 0 V so that the lower layer electrode (ii) and the lower layer electrode (iii) have reverse polarities to each other.

In the second drive system, the liquid crystal is driven by generating a fringe electric field between the upper layer electrode (i), the lower layer electrode (ii), and the lower layer electrode (iii) by setting both the lower layer electrode (ii) and the lower layer electrode (iii) to 0 V and applying a voltage with a reversed polarity to the upper layer electrode (i) according to the gray-scale.

Figure 4:
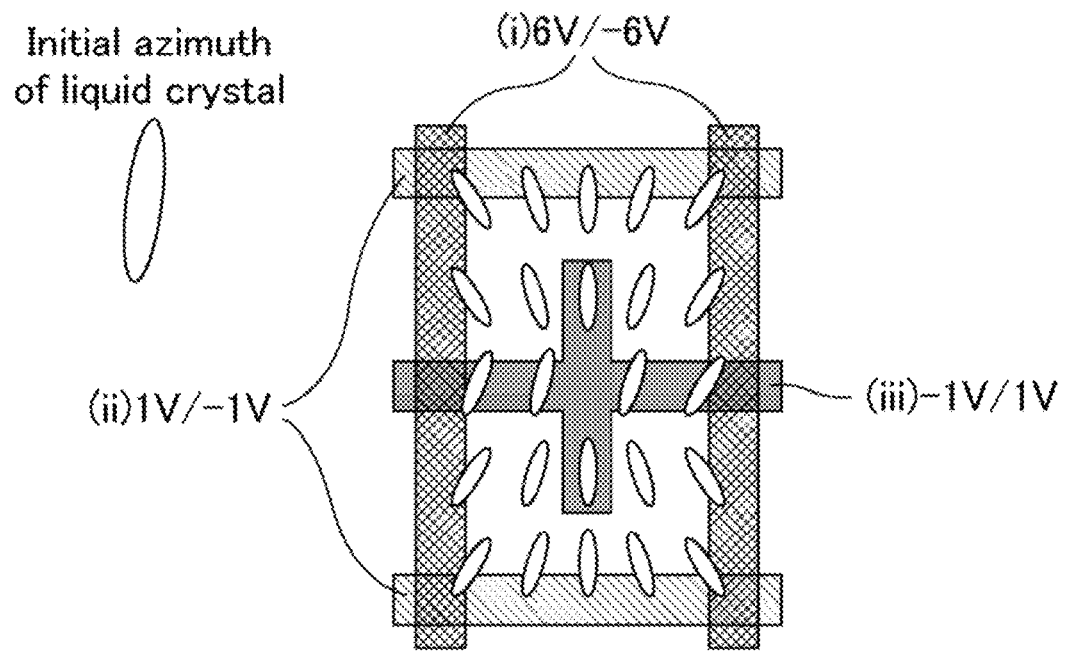
FIG. 4 is a plan schematic view showing applied voltages to the respective electrodes and alignment of liquid crystal molecules in a white display state by the first drive system of Embodiment 1.
Figure 5:
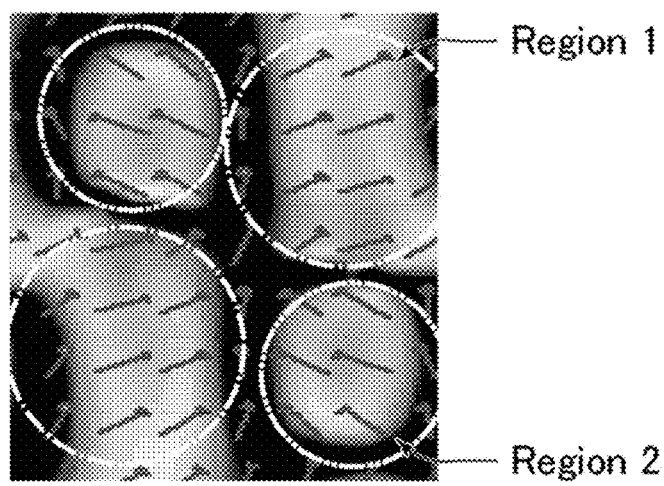
FIG. 5 is a simulation result showing director distribution and transmittance distribution corresponding to FIG. 4.
Figure 6:
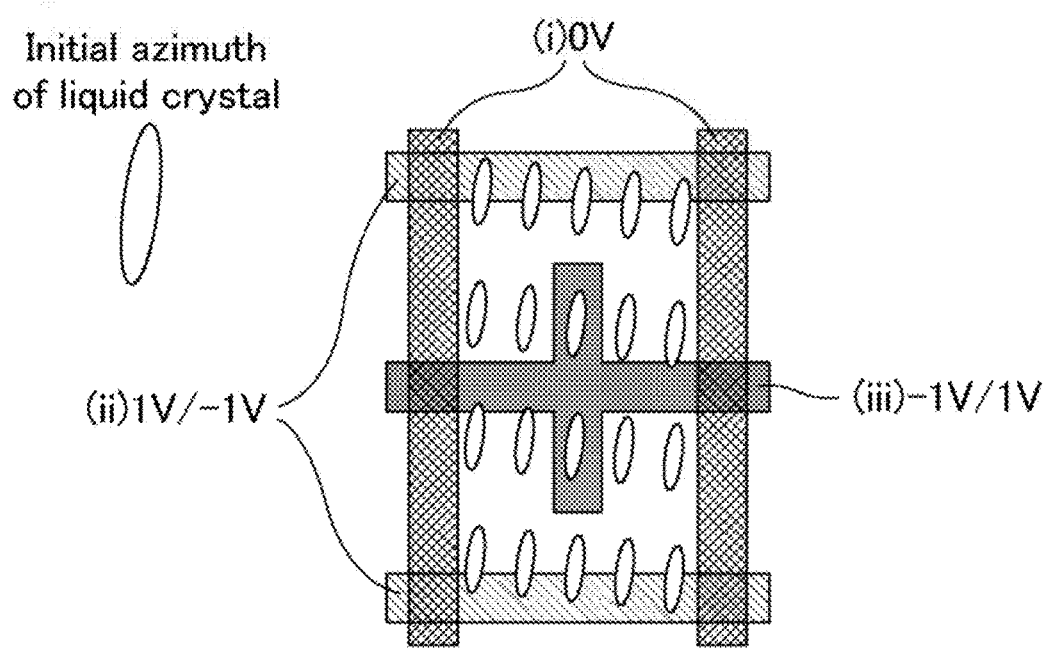
FIG. 6 is a plan schematic view showing applied voltages to the respective electrodes and alignment of liquid crystal molecules in a black display state by the first drive system of Embodiment 1.
Figure 7:
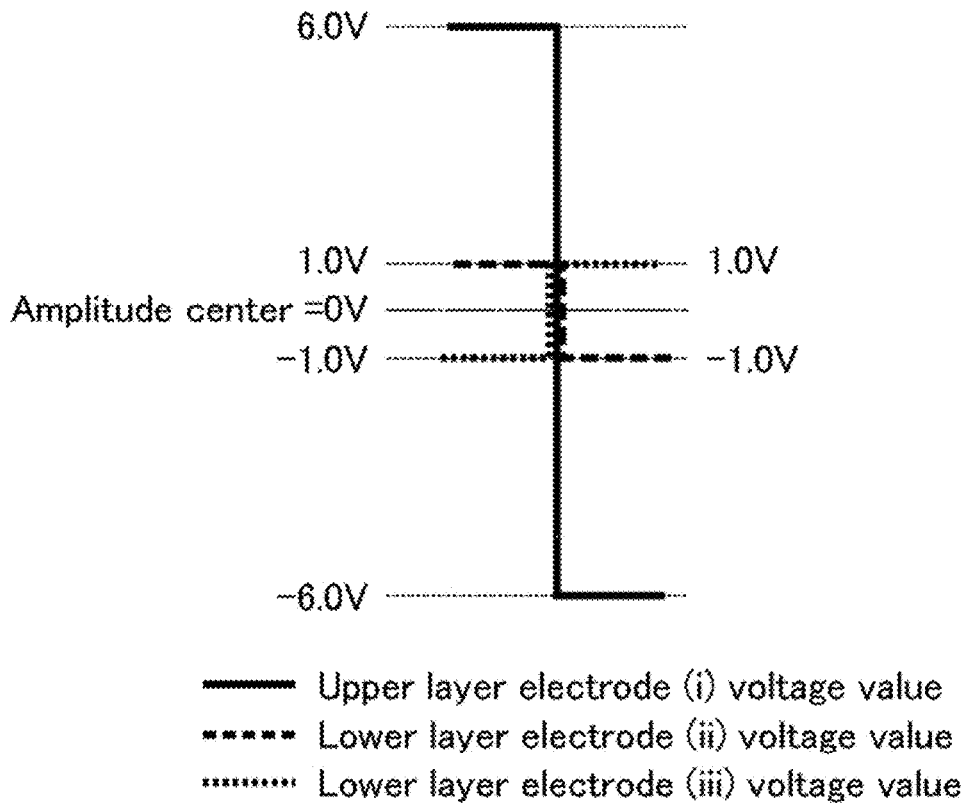
FIG. 7 is a voltage relationship diagram showing applied voltages to the respective electrodes in a white display state by the first drive system of Embodiment 1.

FIG. 4 is a plan schematic view showing applied voltages to the respective electrodes and alignment of liquid crystal molecules in a white display state by a first drive system of Embodiment 1. FIG. 5 is a simulation result showing director distribution and transmittance distribution corresponding to FIG. 4. FIG. 6 is a plan schematic view showing applied voltages to the respective electrodes and alignment of liquid crystal molecules in a black display state by the first drive system of Embodiment 1. FIG. 7 is a voltage relationship diagram showing applied voltages to the respective electrodes in a white display state by the first drive system of Embodiment 1. FIG. 4 to FIG. 6 each show a section surrounded by a broken line in FIG. 1.

First, operation of liquid crystal molecules in rise time will be described in detail.

Between the lower layer electrode (ii) and the lower layer electrode (iii), as shown in FIG. 4 and FIG. 7, a transverse electric field is constantly generated by constantly applying voltages with polarity reversed with an amplitude center set at 0 V so that the lower layer electrode (ii) and the lower layer electrode (iii) have reverse polarities to each other. The absolute values of the voltages applied to the lower layer electrode (ii) and the lower layer electrode (iii) are always the same. Moreover, by applying a voltage to the upper layer electrode (i) with polarity reversed, an electric field is generated to rotate the liquid crystal molecules alternately to different azimuths in a horizontal plane and, by the electric field, the liquid crystal molecules are aligned in such a manner that they have bend alignment and splay alignment in the horizontal plane. In the first drive system of the present embodiment, in a white gray-scale display state, 6 V/−6 V is applied to the upper layer electrode (i), 1 v/−1 V is applied to the lower layer electrode (ii), and −1 V/1 V is applied to the lower layer electrode (iii). In the liquid crystal display device of Embodiment 1, for reasons described later, stability of alignment of the liquid crystal molecules can be maintained even when the applied voltages to the lower layer electrode (ii) and the lower layer electrode (iii) are decreased and, thus, the applied voltages to the lower layer electrode (ii) and the lower layer electrode (iii) can be decreased in order to reduce black floating. Therefore, from the viewpoint of reducing black floating, it is preferable, for example, to set absolute value of the voltage applied to each of the lower layer electrode (ii) and the lower layer electrode (iii) to 2 V or less, more preferably 1.5 V or less. Furthermore, a potential difference between the upper layer electrode (i) and the lower layer electrode (ii) is 5 V, but is preferably, for example, 8 V or less, more preferably 7 V or less, even more preferably 6 V or less. The potential difference is preferably 1 V or more, more preferably 2 V or more, even more preferably 4 V or more.

A potential difference between the upper layer electrode (i) and the lower layer electrode (iii) is 7 V, but is preferably 2 to 12 V, more preferably 3 to 11 even more preferably 3 to 10 V.

As can seen from a transmittance distribution diagram (FIG. 5) based on simulation, the liquid crystal molecules in Region 1 and Region 2 are rotating to different azimuths, and Region 1 and Region 2 are present alternately. That is, in the first drive system, the liquid crystal molecules rotate to different azimuths alternately in a horizontal plane. In Region 1 (first region) shown in FIG. 5, the liquid crystal molecules rotate in the horizontal plane in a clockwise direction and, in Region 2 (second region), the liquid crystal molecules rotate in the horizontal plane in a counterclockwise direction. In other words, in a plan view of the lower substrate, the liquid crystal molecules rotate not in one direction but in different two directions between linear electrodes of the upper layer electrode (i) (in an area that superimposes with the slits of the upper layer electrode (i)), between linear electrodes (branch parts) of the lower layer electrode (ii), and between linear electrodes (branch parts) of the lower layer electrode (iii).

Further, because a voltage is constantly applied no each of the lower layer electrode (ii) and the lower layer electrode (iii) so that a transverse electric field is generated between the lower layer electrode (ii) and the lower layer electrode (iii), a strong electric field is generated in the whole area in the horizontal plane in rise response. Therefore, the rise response is accelerated.

Next, operation of liquid crystal molecules in decay time will be described.

As shown in FIG. 6, by weakening the voltage that has been applied to the upper layer electrode (i), the liquid crystal molecules respond to the transverse electric field generated by the lower layer electrode (ii) and the lower layer electrode (iii), and are rotated forcibly by the electric field to the azimuth of initial alignment. Furthermore, restoring force of the liquid crystal molecules that have had bend alignment and splay alignment in a horizontal plane in a white display state also works to accelerate the response further. In the first drive system of the present embodiment, in a black gray-scale display state, the voltage of the upper layer electrode (i) is 0 V, while 1 V/−1 V is applied to the lower layer electrode (ii), and −1 V/1 V is applied to the lower layer electrode (iii).

In the first drive system, voltages (in FIG. 6, 1 V/−1 V and −1 V/1 V) are constantly applied to the lower layer electrode (ii) and the lower layer electrode (iii) also in decay response, and therefore, when the voltage of the upper layer electrode (i) is reduced or zeroed, the liquid crystal molecules are forcibly rotated by the electric field generated between the lower layer electrode (ii) and the lower layer electrode (iii) in a direction tearing back to the initial alignment. Furthermore, in the case of the first drive system, bend alignment and splay alignment occur in a horizontal plane, and due to elastic strain induced thereby, large restoring force also works. Therefore, the decay response is also accelerated. Meanwhile, in the first drive system, there exist at least two alternate consecutive regions where the liquid crystal molecules rotate in a plane to different azimuths. In this way, it is preferable that there exist at least two regions in succession in a plane, where the liquid crystal molecules rotate to different azimuths.

As described above, in FIG. 6, the voltage of the upper layer electrode (i) was set at 0 V. In this way, except when the voltage of the pixel electrode (the upper layer electrode (i) in Embodiment 1) is reduced or zeroed from a voltage at the largest transmittance, the electric potential and the other values of other electrodes (the lower layer electrode (ii) and the lower layer electrode (iii) in Embodiment 1) can be set at the same values in a white display state by the first drive system, with the preferable ranges and the other values being also the same as one values in a white display state by the first drive system. For example, in Embodiment 1, the voltage of the lower layer electrode (ii) is 1 V/−1 V and that of the lower layer electrode (iii) is −1 V/1 V both in a white display state and in a black display state. In this way, the liquid crystal display device of the present invention is preferably such that the lower layer electrode (ii) and the lower layer electrode (iii) of the lower substrate have constant absolute values of voltages both in a white display state and in a black display state.

As for a method for applying a voltage to each electrode in the above-mentioned first drive system, a voltage applied to the upper layer electrode (1), that is a pixel electrode, is varied, while voltages of constant levels are applied to the lower layer electrode (ii) and the lower layer electrode (iii).

Such a voltage application method is one of the preferable embodiments in the liquid crystal display device of the present invention. However, as long as the effects of present invention are exhibited, a vertical positional relationship of each electrode may be changed appropriately. Further, as long as a transverse electric field is generated by causing a potential difference between the lower layer electrode (ii) and the lower layer electrode (iii), voltages may not be applied to both the lower layer electrode (ii) and the lower layer electrode (iii) as described above, but a voltage may be applied to at least one of the lower layer electrode (ii) and the lower layer electrode (iii).

Figure 8:
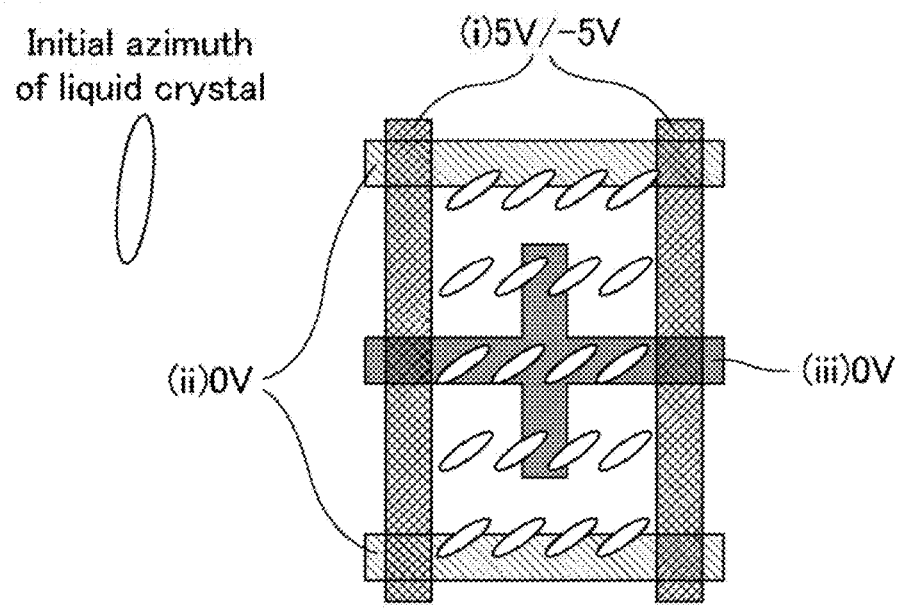
FIG. 8 is a plan schematic view showing applied voltages to the respective electrodes and alignment of liquid crystal molecules in a white display state by the second drive system of Embodiment 1.
Figure 9:
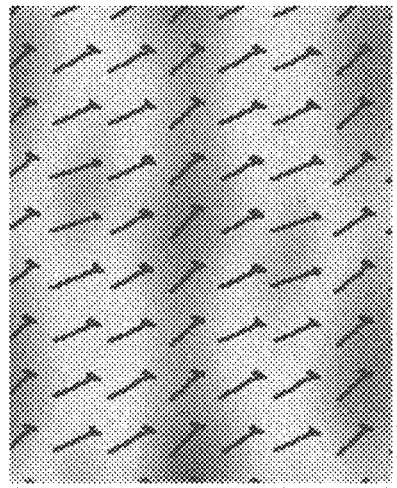
FIG. 9 is a simulation result showing director distribution and transmittance distribution corresponding to FIG. 8.
Figure 10:
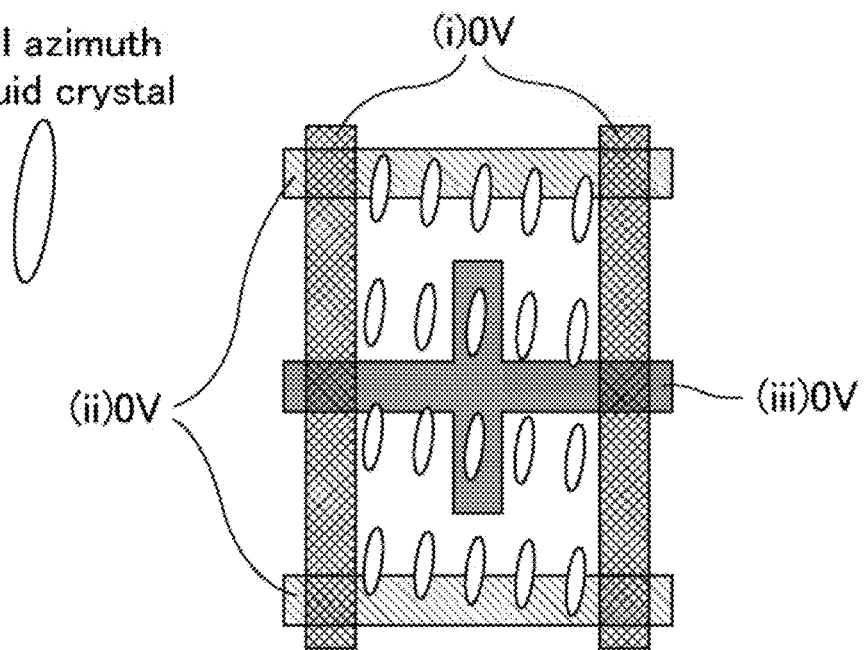
FIG. 10 is a plan schematic view showing applied voltages to the respective electrodes and alignment of liquid crystal molecules in a black display state by the second drive system of Embodiment 1.

FIG. 8 is a plan schematic view showing applied voltages to the respective electrodes and alignment of liquid crystal molecules in a white display state by the second drive system of Embodiment 1. FIG. 9 is a simulation result showing director distribution and transmittance distribution corresponding to FIG. 8. FIG. 10 is a plan schematic view showing applied voltages to the respective electrodes and alignment of liquid crystal molecules in a black display state by the second drive system of Embodiment 1. FIG. 6 to FIG. 10 each show a section corresponding to the section surrounded by a broken line in FIG. 1.

First, operation of liquid crystal molecules in rise time will be described in detail.

As shown in FIG. 8, a fringe electric field is generated between the upper layer electrode (i), the lower layer electrode (ii), and the lower layer electrode (iii) by setting both the lower layer electrode (ii) and the lower layer electrode (iii) to 0 V and, moreover, applying a voltage to the upper layer electrode (i) with the polarity reversed. In response to the electric field, the liquid crystal molecules rotate to the same azimuth. In the second drive system of the present embodiment, 5 V/−5 V is applied to the upper layer electrode (i) in a white gray scale display state.

As can be seen from the transmittance distribution diagram (FIG. 9) based on simulation, high transmittance as a whole can be obtained compared to the first drive system because the liquid crystal molecules rotate to the same azimuth.

In a white display state by the second drive system, the voltage of the upper layer electrode (i) varies according to display, but the upper limit thereof is preferably 10 V, more preferably 8 V, even more preferably 7 V.

Next, operation of liquid crystal molecules in decay time will be described.

As shown in FIG. 10, by turning off the voltage that has been applied to the upper layer electrode (i), the liquid crystal molecules rotate to return towards an azimuth of the alignment treatment (anchoring) due to restoring force of the liquid crystal molecules. In the second drive system of the present embodiment, 0 V is applied to the upper layer electrode (i) in a black display state. Applied voltages to other electrodes (the lower layer electrode (ii) and the lower layer electrode (iii)) are the same as those in a white display state by the second drive system, with 0 V being applied. In a black display state by the second drive system, the applied voltages to the upper layer electrode (i), the lower layer electrode (ii), and the lower layer electrode (iii) may be set to less than the threshold voltage.

Figure 11:
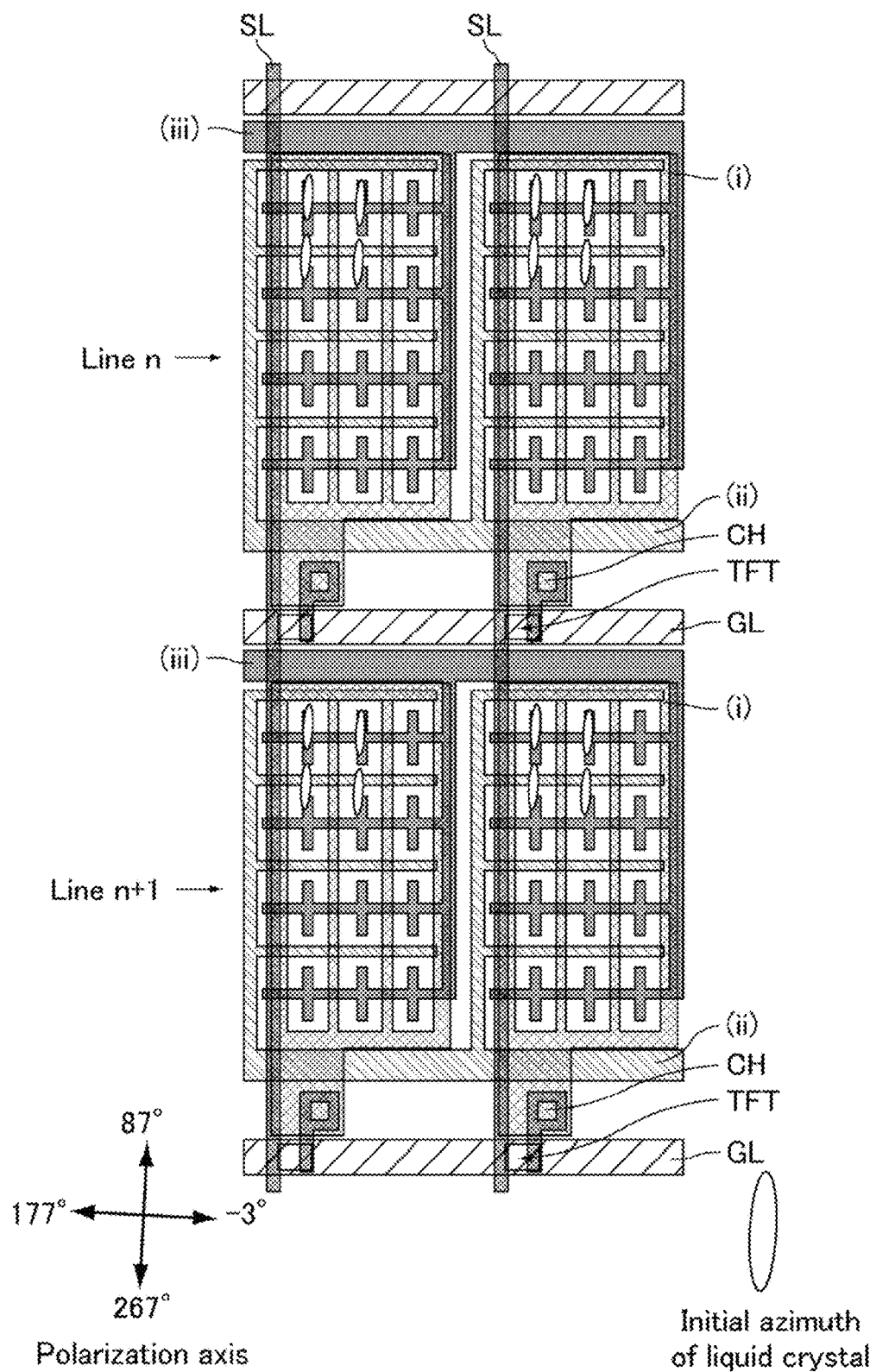
FIG. 11 is a plan schematic view showing an example of a pixel layout when the liquid crystal display device of Embodiment 1 is TFT driven.

FIG. 11 is a plan schematic view showing an example of pixel layout when the liquid crystal display device of Embodiment 1 is TFT driven. FIG. 11 is an example, and electrode structures and conductive lines, for example, are not limited to these shapes.

In Embodiment 1, because voltages applied to the lower layer electrode (ii) and the lower layer electrode (iii) are different between the first drive system and the second drive system, for example, each line (e.g., gate bus line) is scan-driven.

Meanwhile, as the thin-film transistor element in the liquid crystal display device of Embodiment 1, it is preferable, from the viewpoint of transmittance improvement effect, to use a thin-film transistor element containing an oxide semiconductor. The oxide semiconductor exhibits higher carrier mobility than amorphous silicon. Herewith, an area of the pixel occupied by the transistor can be reduced, and thus an aperture ratio increases and light transmittance per pixel becomes possible to be improved. Therefore, by using a thin-film transistor element containing an oxide semiconductor, there can be obtained more remarkably a contrast ratio improvement effect that is an effect of the present invention. Namely, in the liquid crystal display device of the present invention, it is preferable that the lower substrate is provided with a thin-film transistor element, wherein the thin-film transistor element contains an oxide semiconductor.

The liquid crystal display device of Embodiment 1 can be applied to any of transmission-type, reflection-type, and transfective liquid crystal display devices. The same applies to the after-mentioned embodiments.

Comparison of Transmittance of First Drive System and Second Drive System in Embodiment 1

Presence or absence of an effect of switching from first drive system to the second drive system for improving transmittance was examined by calculating voltage-transmittance (V-T) characteristics of the first drive system and the second drive system of Embodiment 1 by using LCD Master 3D. In Table 1, there is shown transmittance in a white display state by the first drive system and the second drive system of Embodiment 1. The second drive system (maximum transmittance: 34.9%) was found to show higher maximum transmittance than the first drive system (maximum transmittance: 23.4%), which means that switching from the first drive system to the second drive system could improve transmittance.

TABLE 1

|  | Transmittance (%) | |
| --- | --- | --- |
|  | First drive system | Second drive system |
| Embodiment 1 | 23.4 | 34.9 |

Figure 12:
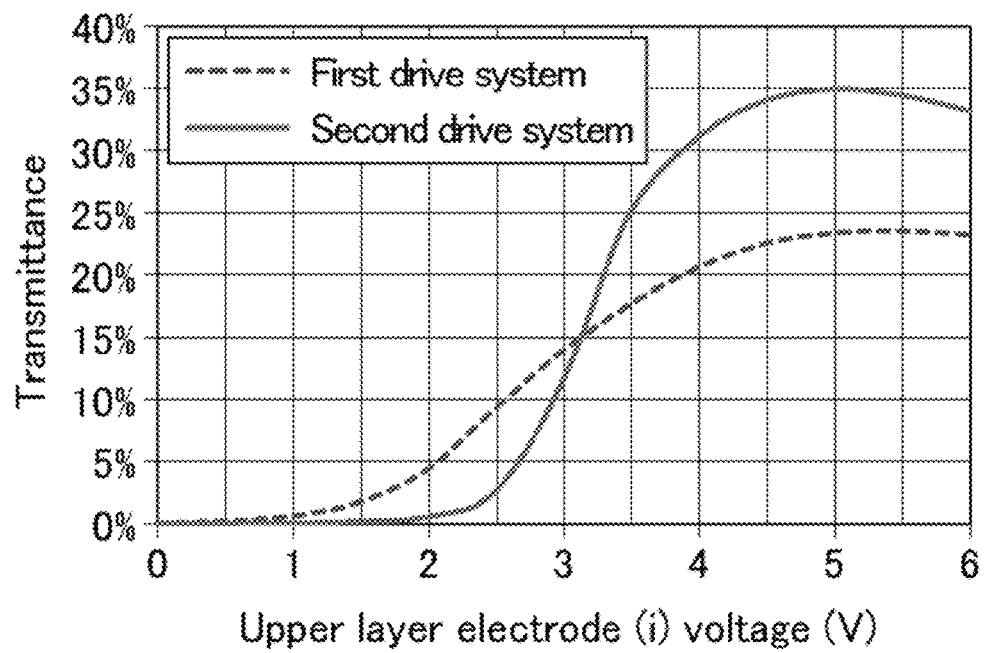
FIG. 12 is a graph showing voltage-transmittance (V-T) characteristics of the upper layer electrode (i) by each of the first drive system and the second drive system of Embodiment 1.

FIG. 12 is a graph showing voltage-transmittance (V-T) characteristics of the upper layer electrode (i) of each of the first drive system and the second dive system of Embodiment 1. This drawing also shows that the second drive system exhibits higher transmittance than the first drive system.

Comparative Example 1

Figure 13:
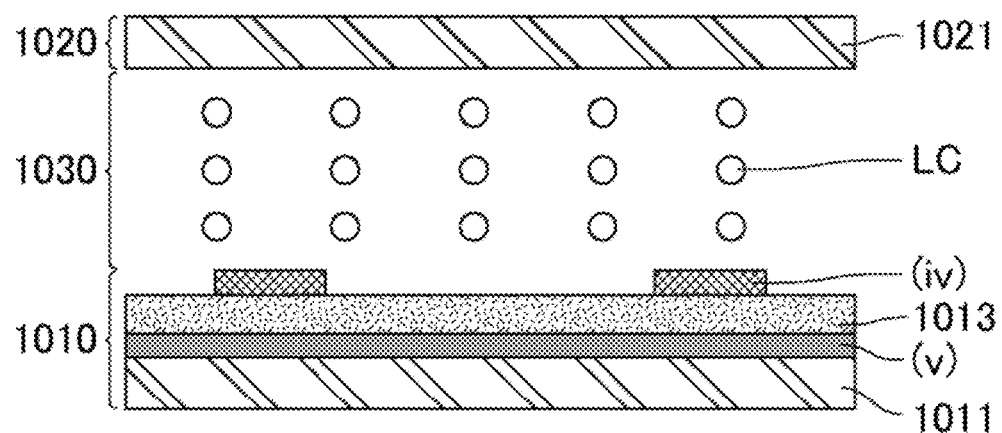
FIG. 13 is a cross-sectional schematic view showing an electrode structure and initial alignment of the liquid crystal molecules of a liquid crystal display device of Comparative Example 1.

FIG. 13 is a cross-sectional schematic view showing an electrode structure and initial alignment of liquid crystal molecules of liquid crystal display device of Comparative Example 1. FIG. 13 is also a cross-sectional schematic view showing an example of an electrode structure of a conventional FFS mode liquid crystal display device.

In Comparative Example 1, the lower layer electrode (v) of a lower substrate 1010 is a planar electrode, and an upper layer electrode (iv), that is a slit electrode, is arranged with an insulating layer 1013 interposed between them. In the upper layer electrode (iv) of the lower substrate, a pair of comb electrodes may be used instead of the slit electrode. On an upper substrate 1020, there is arranged no electrode for controlling liquid crystals.

On each of the liquid crystal layer sides of the upper and lower substrates, a horizontal alignment film (not illustrated) was provided, and liquid crystal molecules under no application of voltage were horizontally aligned so that the azimuth thereof becomes 7° from the extending direction of linear sections of the upper layer electrode (iv). Further, on each side opposite to the liquid crystal layer side of the upper and lower substrates, a polarizing plate (not illustrated) was provided. As the polarizing plate, there was used a linear polarizing plate, and a crossed Nicols arrangement was employed where the polarization axes of the linear polarizing plates on the upper and lower substrates are vertical or parallel to the long axes of the liquid crystal molecules under no application of a voltage to form a liquid crystal display device of a normally black mode. Further, the liquid crystal material and the thickness thereof were the same s those in Embodiment 1. In the upper layer electrode (iv), an electrode width in the linear section is 3 µm and an electrode space between neighboring linear sections is 6 µm. The dielectric constant ε of the insulating layer 1013 is 6.9. Meanwhile, in the liquid crystal display device of Comparative Example 1, other conditions including, for example, alignment film material, alignment film treatment method, and insulation film material are the same as those of the corresponding members of the liquid crystal display device of above-mentioned Embodiment 1.

In Comparative Example 1, switching in rise time is performed by generating a fringe electric field between the upper layer electrode (iv) and the lower layer electrode (v) of the lower substrate and rotating liquid crystal molecules near the lower substrate in the same direction in a horizontal plane. Further, switching in decay time is performed by weakening or zeroing the fringe electric field and returning the liquid crystal molecules to an original alignment state by the viscoelasticity thereof.

However, in the liquid crystal layer, there is an area where the electric field for rotating the liquid crystal molecules is weak, necessitating time for the liquid crystal molecules in the area to rotate. Further, at this time, because the liquid crystal molecules rotate in the same direction, strain due to elastic deformation of the liquid crystal in the horizontal plane is small. Therefore, when performing switching in decay time by weakening or zeroing the electric field, restoring force due to elastic deformation that works for the liquid crystal molecules to return to the original alignment state is small, resulting in slow response. Therefore, response times in both the switching in rise time and the switching in decay time are slow.

Figure 14:
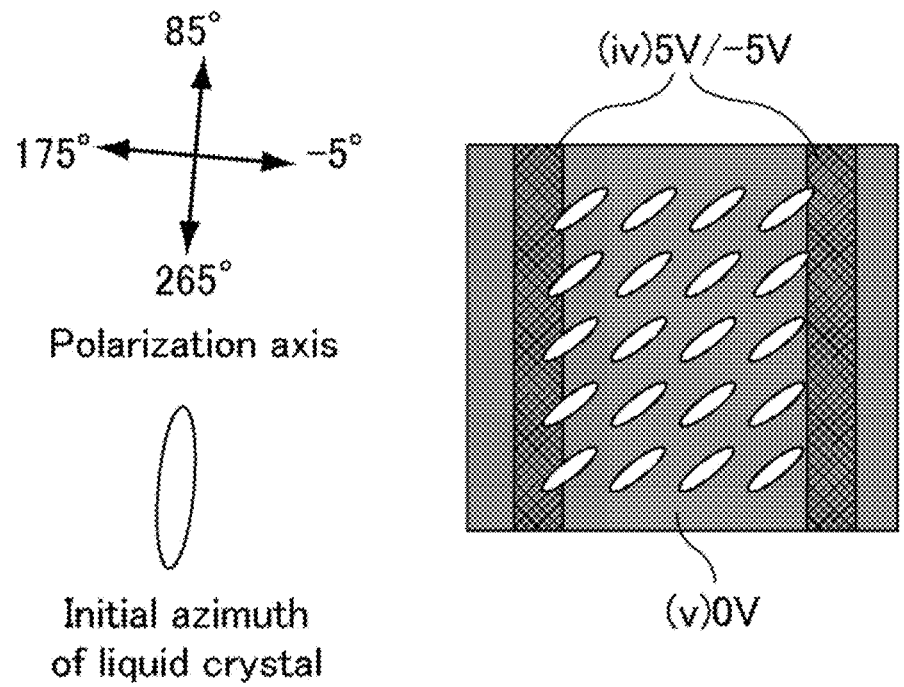
FIG. 14 is a plan schematic view showing applied voltages to the respective electrodes and alignment of liquid crystal molecules in a white display state of the liquid crystal display device of Comparative Example 1.
Figure 15:
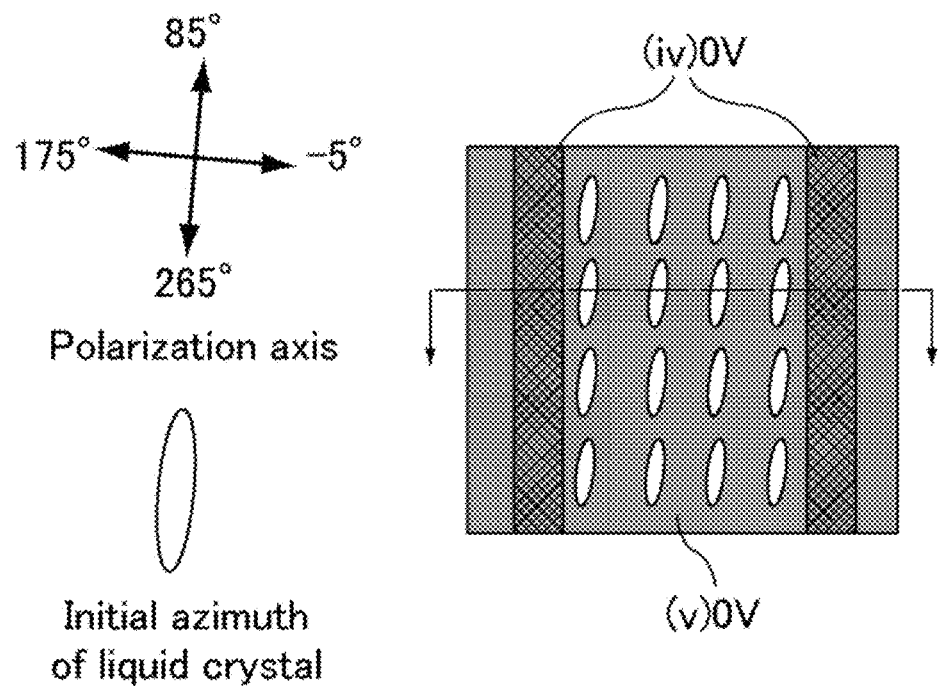
FIG. 15 is a plan schematic view showing applied voltages to the respective electrodes and alignment of liquid crystal molecules in a black display state of the liquid crystal display device of Comparative Example 1.

FIG. 14 is a plan schematic view showing applied voltages to the respective electrodes and alignment of liquid crystal molecules in a white display state of the liquid crystal display device of Comparative Example 1. FIG. 15 is a plan schematic view showing applied voltages to the respective electrodes and alignment of liquid crystal molecules in a black display state of the liquid crystal display device of Comparative Example 1. In FIG. 14 and FIG. 15, a principle at the time of voltage application in Comparative Example 1 is shown.

The liquid crystal molecules, in the initial alignment, are determined as described above to align in a direction that makes an angle of 7° with the extending direction of the linear sections of the upper layer electrode (iv) that is a pixel electrode.

First, operation of liquid crystal molecules in rise time will be described in detail.

When a voltage is applied to the upper layer electrode (iv), a fringe electric field is generated between the upper layer electrode (iv) and the lower layer electrode (v). Here, the liquid crystal molecules rotate in such a way as to move away from an azimuth axis and optically modulate from black display to white display. In the present comparative example, 5 V is applied with polarity reversed to the upper layer electrode (iv) in a white gray scale display state.

Next, operation of liquid crystal molecules in decay time will be described.

By turning off the voltage, the fringe electric field becomes extinguished, and the liquid crystal molecules rotate to return towards the azimuth of the initial alignment (anchoring) due to restoring force of the liquid crystal molecules that are elastic. The alignment film, alignment method, insulation film that are necessary for controlling alignment of the liquid crystals are the same as those mentioned above in Embodiment 1.

Comparison of Response Characteristics and Transmittance of Embodiment 1 and Comparative Example 1

Response characteristics and transmittance of Embodiment 1 and Comparative Example 1 were compared by calculating response times and transmittance of Embodiment 1 and Comparative Example 1 by using LCD Master 3D. As the physical properties of the liquid crystal, values at room temperature were used. In Table 2, response times and transmittance of Embodiment 1 and Comparative Example 1 are shown.

In the item of Tr+Td, the value of Tr+Td is shown, where a response time for change in transmittance from 10% to 90% is denoted by Tr, and a response time for change in transmittance from 90% to 10% is denoted by Td. Further, as an index to determine how well the fast response and high transmittance are both achieved, (response time)/transmittance was calculated. The smaller this value is, the better the fast response and high transmittance are both achieved.

TABLE 2

|  | Tr + Td (ms) *1 | Transmittance (%) *2 | Tr + Td (ms)/ Transmittance (%) |
| --- | --- | --- | --- |
| Embodiment 1 | 19.7 | 34.9 | 0.564 |
| Comparative Example 1 | 29.8 | 35.0 | 0.861 |

*1 Response time of Embodiment is a value by the first drive system.
*2 Transmittance of Embodiment 1 is a value by the second drive system.

As is shown in Table 2, Embodiment 1 has a smaller value of (response time)/transmittance than Comparative Example 1 and, therefore, can be said to be better than Comparative Example 1 as driving that can achieve both fast response and high transmittance.

Figure 16:
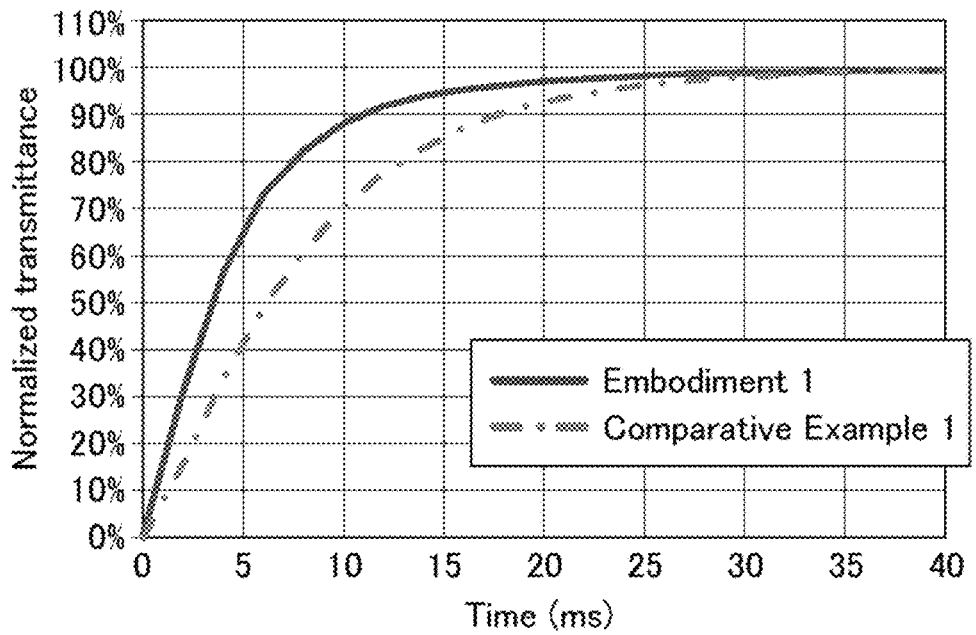
FIG. 16 is a graph showing the normalized transmittance against time in rise time in Embodiment 1 and Comparative Example 1.
Figure 17:
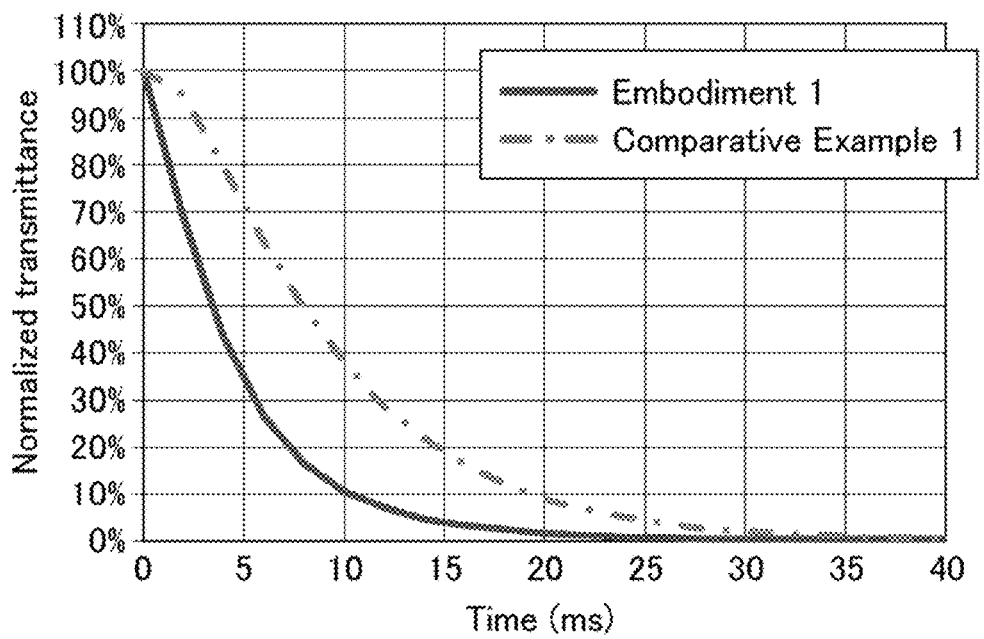
FIG. 17 is a graph showing the normalized transmittance against time in decay time in Embodiment 1 and Comparative Example 1.

FIG. 16 is a graph showing normalized transmittance against time in rise time in Embodiment 1 and Comparative Example 1. FIG. 17 is a graph showing normalized transmittance against time in decay time in Embodiment 1 and Comparative Example 1. These FIG. 16 and FIG. 17 show results of response simulation of Embodiment 1 and Comparative Example 1, suggesting that Embodiment 1 is faster than Comparative Example 1 both in rise response and decay response.

Accordingly, in the first drive system of Embodiment 1, an electric field can be generated to rotate the liquid crystal molecules alternately to different azimuths in a horizontal plane, acceleration becomes possible both in rise time and in decay time, and both a wide viewing angle and fast response can be achieved. In the second drive system of Embodiment 1, as in the FFS mode, an electric field can be generated to rotate the liquid crystal molecules in the same direction in the entire area, and both a wide viewing angle and fast response can be achieved.

Comparative Example 2

A liquid crystal display device of Comparative Example 2, as shown in an after-mentioned drawing, is provided in the lower substrate with an upper layer electrode (i), a lower layer electrode (ii), and a lower layer electrode (iii) that is arranged in the same layer as the lower layer electrode (ii).

The upper layer electrode (i) contains a plurality of linear electrode sections in a plan view of the lower substrate. The plurality of linear electrode sections are nearly parallel to each other, and between the linear electrode sections, there are arranged slits that are nearly parallel to each other.

The lower layer electrode (ii) and the lower layer electrode (iii) are each composed of a trunk part and branch parts extending from the trunk part in a plan view of the lower substrate. In each electrode, the branch parts are linear electrode sections that are nearly parallel to each other. Unlike Embodiment 1, the branch parts of the lower layer electrode (iii) are not partially wide but have equal widths.

The extending direction of the branch parts of each of the lower layer electrode (ii) and the lower layer electrode (iii) is set to make an angle of 87° with the extending direction of the linear sections of the upper layer electrode (i). In the upper layer electrode (i), the electrode width of the linear sections is 3 μm, and the electrode space between the neighboring linear sections is 6 μm. In the branch parts of a pair of comb electrodes composed of the lower layer electrode (ii) and the lower layer electrode (iii), the electrode width of the linear sections is 3 μm, and the electrode space between the neighboring linear sections is 3 μm.

In the following, a driving method of the liquid crystal using the liquid crystal display device of Comparative Example 2 will be described.

In Comparative Example 2, driving that enables fast response is achieved. Further, by changing a voltage application method, there are achieved two kinds of driving including driving capable of fast response and driving that achieves higher transmittance than the former with the same configuration. In the same way as in Embodiment 1, driving that achieves fast response shall be referred to as the first drive system, and driving that achieves higher transmittance than the former shall be referred to as the second drive system.

Figure 18:
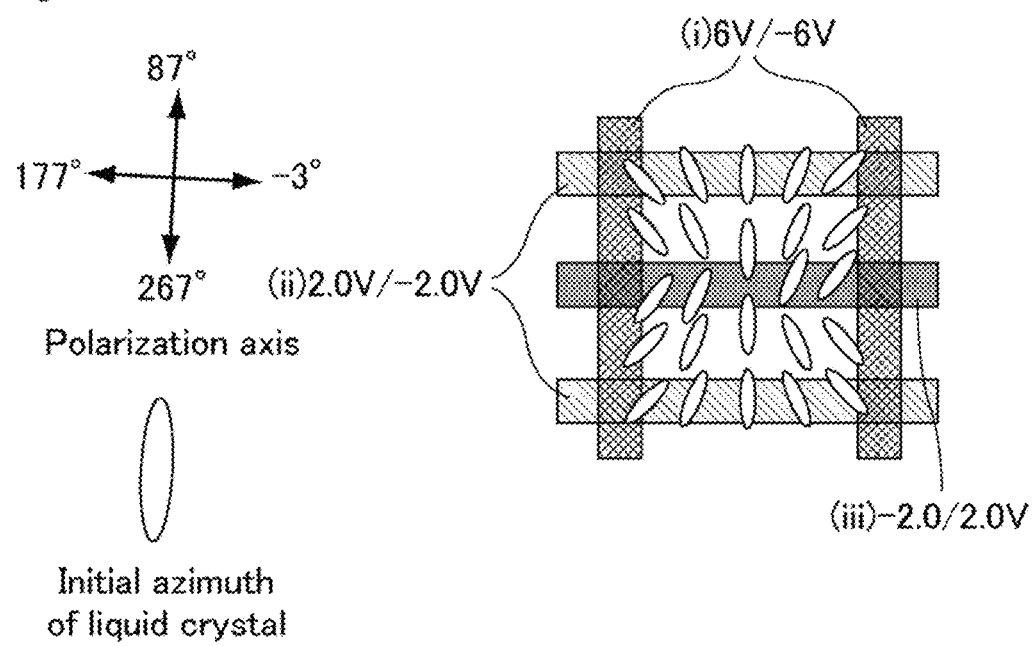
FIG. 18 is a plan schematic view showing applied voltages to the respective electrodes and alignment of liquid crystal molecules in a white display state by the first drive system of Comparative Example 2.
Figure 19:
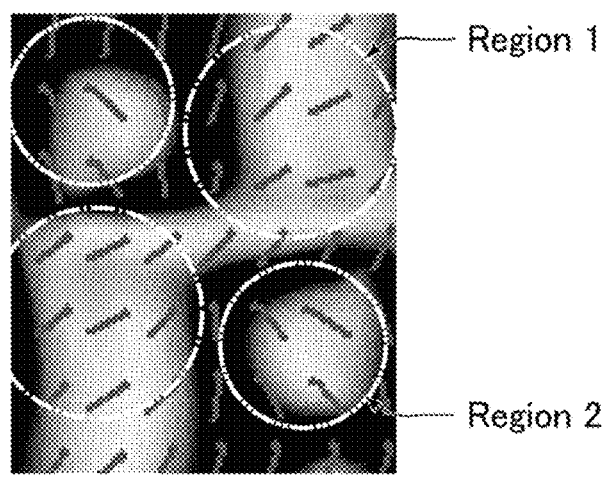
FIG. 19 is a simulation result showing director distribution and transmittance distribution corresponding to FIG. 18.
Figure 20:
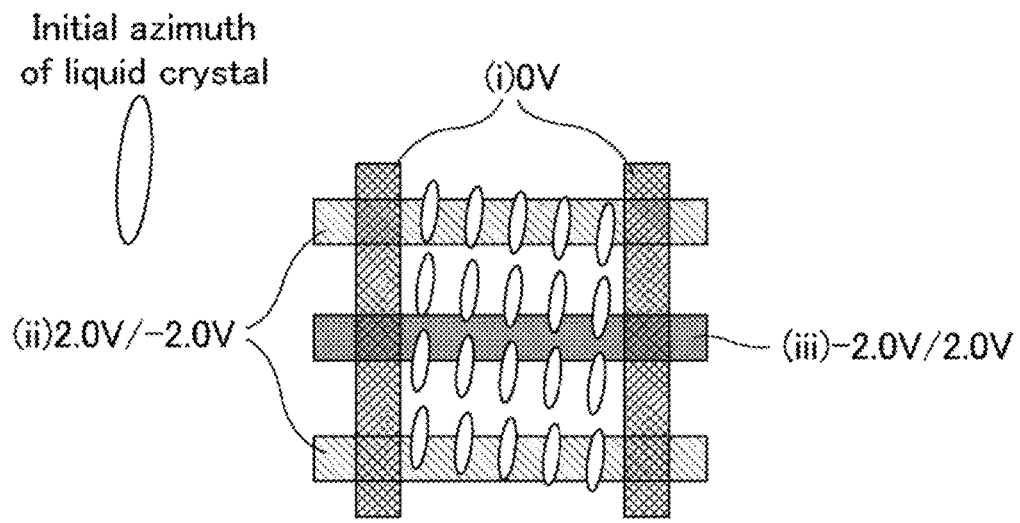
FIG. 20 is a plan schematic view showing applied voltages to the respective electrodes and alignment of liquid crystal molecules in a black display state by the first drive system of Comparative Example 2.
Figure 21:
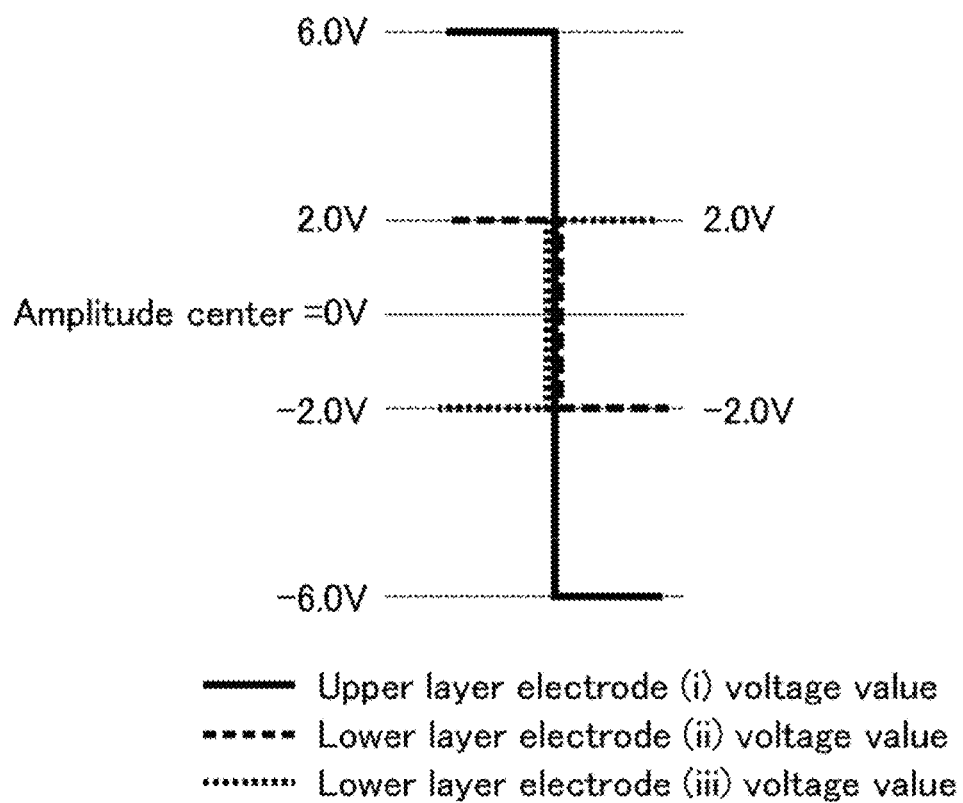
FIG. 21 is a voltage relationship diagram showing applied voltages to the respective electrodes in a white display state by the first drive system of Comparative Example 2.

FIG. 18 is a plan schematic view showing applied voltages to the respective electrodes and alignment of liquid crystal molecules in a white display state by a first drive system of Comparative Example 2. FIG. 19 is a simulation result showing director distribution and transmittance distribution corresponding to FIG. 18. FIG. 20 is a plan schematic view showing applied voltages to the respective electrodes and alignment of liquid crystal molecules in a black display state by a first drive system of Comparative Example 2. FIG. 21 is a voltage relationship diagram showing applied voltages to the respective electrodes in a white display state by a first drive system of Comparative Example 2. Meanwhile, as with Embodiment 1, the long axes of the liquid crystal molecules under no application of voltage are at an azimuth that makes an angle of 3° with the extending direction of the linear sections of the upper layer electrode (i).

First, operation of liquid crystal molecules in rise time will be described in detail.

Between the lower layer electrode (ii) and the lower layer electrode (iii), a transverse electric field is constantly generated by constantly applying voltages with polarity reversed with an amplitude center set at 0 V so that the lower layer electrode (ii) and the lower layer electrode (iii) have reverse polarities to each other. The absolute values of voltages applied to the lower layer electrode (ii) and the lower layer electrode (iii) are always the same. Moreover, by applying voltage to the upper layer electrode (i) with polarity reversed, an electric field is generated to rotate the liquid crystal molecules alternately to different azimuths in a horizontal plane, and by the electric field, the liquid crystal molecules are aligned in such a manner that they have bend alignment and splay alignment in the horizontal plane. In the first drive system of Comparative Example 2, in a white display state, 6 V/–6 V is applied to the upper layer electrode (i), 2.0 v/–2.0 V is applied to the lower layer electrode (ii), and –2.0 V/2.0 V is applied to the lower layer electrode.

As can be seen from a transmittance distribution diagram (FIG. 19) based on simulation, the liquid crystal molecules in Region 1 and Region 2 are rotating to different azimuths, and it can be seen that Region 1 and Region 2 are present alternately. That is, in the first drive system, the liquid crystal molecules rotate to different azimuths alternately in a horizontal plane. In Region 1 (first region) shown in FIG. 19, the liquid crystal molecules rotate in a horizontal plane in a clockwise direction and, in Region 2 (second region), the liquid crystal molecules rotate in a horizontal plane in a counterclockwise direction.

Next, operation of liquid crystal molecules in decay time will be described.

As shown in FIG. 20, by weakening voltage that has been applied to the upper layer electrode (i), the liquid crystal molecules respond to the transverse electric field generated by the lower layer electrode (ii) and the lower layer electrode (iii), and are rotated forcibly by the electric field to the azimuth of initial alignment. Furthermore, restoring force of the liquid crystal molecules that had bend alignment and splay alignment in a horizontal plane in a white display state also works to accelerate the response further. In the first drive system of Comparative Example 2, in a black display, the voltage of the upper layer electrode (i) is 0 V, while 2.0 V/–2.0 V is applied to the lower layer electrode (ii), and –2.0 V/2.0 V is applied to the lower layer electrode (iii).

Figure 22:
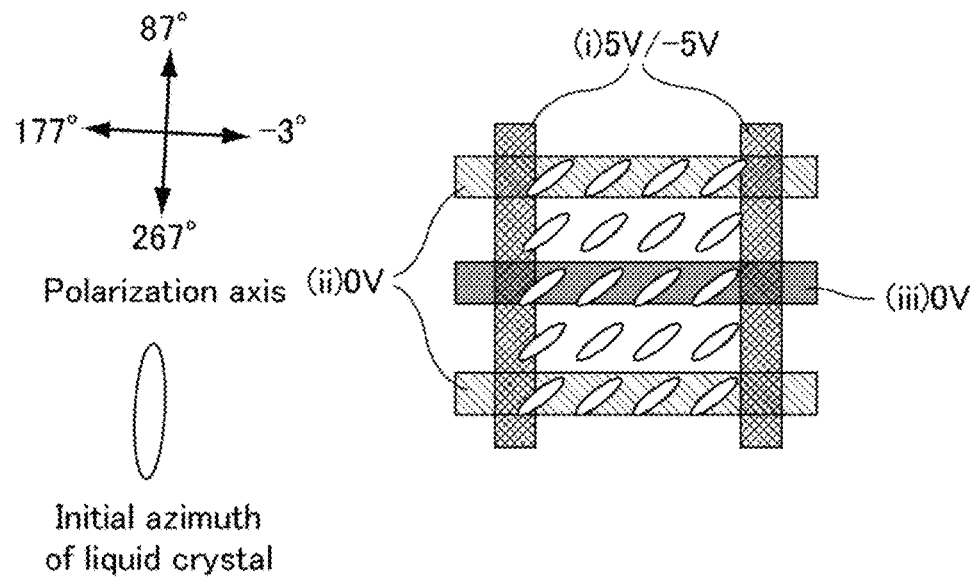
FIG. 22 is a plan schematic view showing applied voltages to the respective electrodes and alignment of liquid crystal molecules in a white display state by the second drive system of Comparative Example 2.
Figure 23:
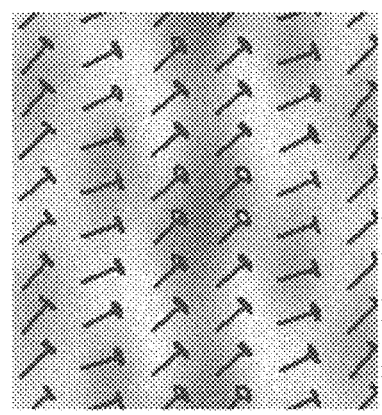
FIG. 23 is a simulation result showing director distribution and transmittance distribution corresponding to FIG. 22.
Figure 24:
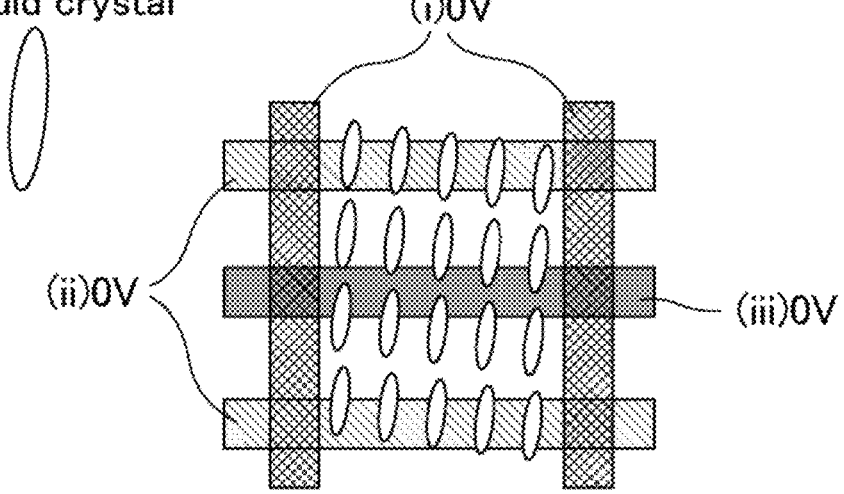
FIG. 24 is a plan schematic view showing applied voltages to the respective electrodes and alignment of liquid crystal molecules in a black display state by the second drive system of Comparative Example 2.

FIG. 22 is a plan schematic view showing applied voltages to the respective electrodes and alignment of liquid crystal molecules in a white display state by the second drive system of Comparative Example 2. FIG. 23 is a simulation result snowing director distribution and transmittance distribution corresponding to FIG. 22. FIG. 24 is a plan schematic view showing applied voltages, to the respective electrodes and alignment of liquid crystal molecules in a black display state by the second drive system of Comparative Example 2.

First, operation of liquid crystal molecules in rise time will be described in detail.

As shown in FIG. 22, a fringe electric field is generated between the upper layer electrode (i), the lower layer electrode (ii), and the lower layer electrode (iii) by setting both the lower layer electrode (ii) and the lower layer electrode (iii) to 0 V and, moreover, applying a voltage to the upper layer electrode (i) with the polarity reversed. In response to the electric field, the liquid crystal molecules rotate to the same azimuth. In the second drive system of Comparative Example 2, 5 V/–5 V is applied to the upper layer electrode (i) in a white gray-scale display state.

As can be seen from the transmittance distribution diagram (FIG. 23) based on simulation, high transmittance as a whole can be obtained compared to the first drive System of Comparative Example 2 because the liquid crystal molecules rotate to the same azimuth.

Next, operation of liquid crystal molecules in decay time will be described.

As shown in FIG. 24, by turning off the voltage that has been applied to the upper layer electrode (i), the liquid crystal molecules rotate to return towards the azimuth of the alignment treatment (anchoring) by their restoring force. In the second drive system of Comparative Example 2, 0 V is applied to the upper layer electrode (i) in a black display state. Applied voltages to other electrodes (the lower layer electrode (ii) and the lower layer electrode (iii)) are the same as those in a white display state by the second drive system, with 0 V being applied.

The configuration of the liquid crystal display device of Comparative Example 2 other than those mentioned above is the same as the aforementioned configuration of the liquid crystal display device of Embodiment 1.

Comparison of Response Characteristics of Embodiment 1 and Comparative Example 2

In Table 3, contrast ratios by the first drive system in Embodiment 1 and Comparative Example 2 are shown. The term. "CR" in Table 3 refers to the contrast ratio.

TABLE 3

|  | CR |
|---|---|
| Embodiment 1 | 577 |
| Comparative Example 2 | 107 |

From the results of Table 3, it can be seen that the contrast ratio in Embodiment 1 is much improved compared to that in Comparative Example 2. The reason for this will be described later.

Figure 25:
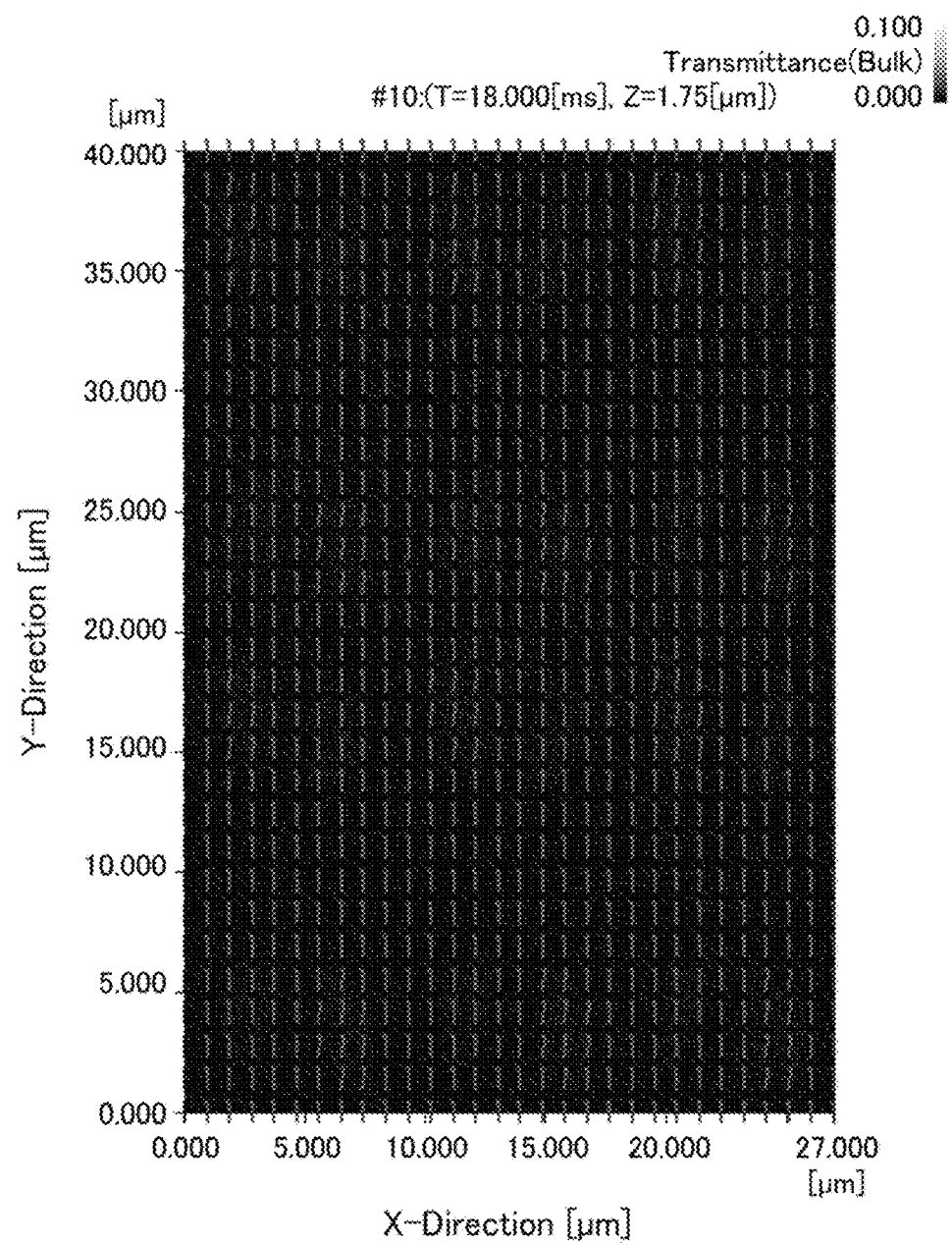
FIG. 25 is a simulation result showing director distribution and transmittance distribution in a black display state by the first drive system of Embodiment 1.
Figure 26:
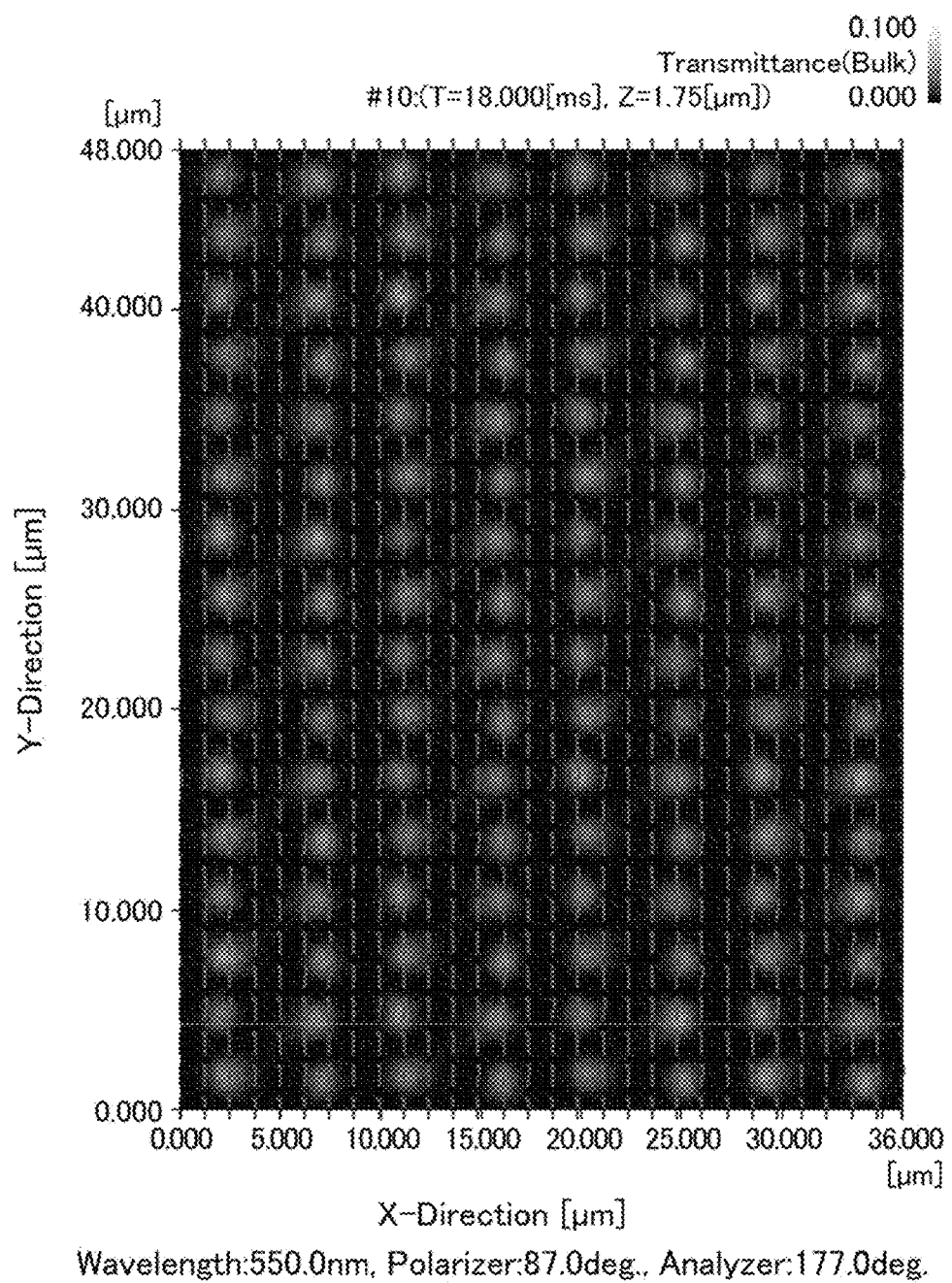
FIG. 26 is a simulation result showing director distribution and transmittance distribution in a black display state by the first drive system of Comparative Example 2.

FIG. 25 is a simulation result showing director distribution and transmittance distribution in a black display state by the first drive system of Embodiment 1. FIG. 26 is a simulation result showing director distribution and transmittance distribution in a black display state by the first drive system of Comparative Example 2.

FIG. 25 and FIG. 26 were made based on the same standards as shown by a barometer "Transmittance (Bulk)" on the top right of each figure.

As shown in FIG. 25 and FIG. 26, black floating can be prevented better in a black display state by the first drive system of Embodiment 1 than in a black display state by the first drive system of Comparative Example 2.

Reason why Alignment Stability Improves in Embodiment 1 Compared to Comparative Example 2

Figure 27:
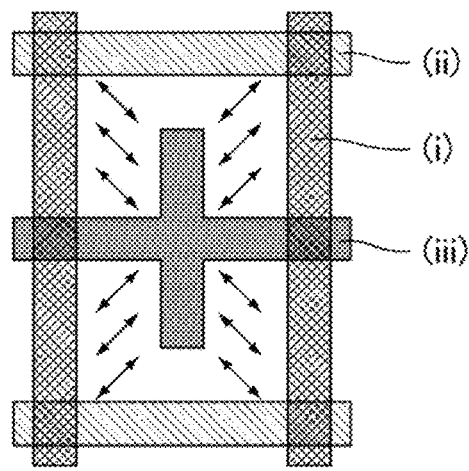
FIG. 27 is a schematic view showing an electric field generated in Embodiment 1.
Figure 28:
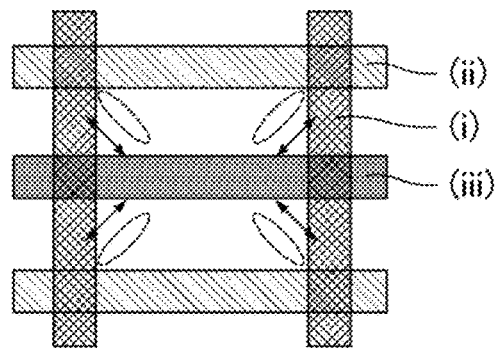
FIG. 28 is a schematic view showing an electric field generated in Comparative Example 2.

FIG. 27 is a schematic view showing an electric field generated in Embodiment 1. FIG. 28 is a schematic view showing an electric field generated in Comparative Example 2. To stabilize alignment of the liquid crystal molecules by the first drive system of the liquid crystal display device of Comparative Example 2, it is desirable no set a level of the voltage applied to the lower layer electrodes (ii) and (iii) to 2.5 V. However, in Embodiment 1, the alignment of the liquid crystal molecules stabilizes even when the level of the voltage applied to the lower layer electrodes (ii) and (iii) is 1 V. The reason for this will be described in the following.

In FIG. 28 (Comparative Example 2), an electric field that rotates liquid crystal molecules to a desired direction is generated only in the vicinity of intersections of the upper layer electrode (i) and the lower layer electrode (iii).

On the other hand, in Embodiment 1, the shape of an electrode to which a voltage having polarity opposite to that of the voltage applied to the upper layer electrode (i) is applied is altered compared to Comparative Example 2, and the electrode shape is one having a protrusion such as shown in FIG. 27.

In FIG. 27 (Embodiment 1), when voltage is applied to the upper layer electrode (i), an electric field that rotates liquid crystal molecules in a desired direction is generated, owing to the above electrode structure, in a wide area other than the vicinity of the intersections of the upper layer electrode (i) and the lower layer electrode (iii). Herewith, in the first drive system of the liquid crystal display device of Embodiment 1, as compared with that of the liquid crystal display device of Comparative Example 2, alignment of the liquid crystal molecules is more stabilized even when the voltage level applied to the lower layer electrodes (ii) and (iii) has a small value (for example, 1 V). As a result, it becomes possible to prevent black floating, and compared to the liquid crystal display device of Comparative Example 2, a contrast ratio in driving that accelerates response (the first drive system) can be improved remarkably.

Further in the first drive system, the aforementioned liquid crystal display device of the present embodiment can, in rise time, accelerate response because a strong electric field acts on the liquid crystal molecules throughout the horizontal plane because a transverse electric field is applied between a pair of comb electrodes of the lower layer and can, in decay time, achieve a fast response that could not be achieved by the conventional FFS mode because strong restoring force works when the liquid crystal molecules in bend alignment and splay alignment return to an original alignment and, in addition, the liquid crystal molecules respond to the electric field generated by the lower layer electrodes (ii) and (iii).

Further, in the second drive system, by setting the lower layer electrodes (ii) and (iii) of the lower substrate that form a pair of comb electrodes to the same potential, there can be generated a fringe electric field between these electrodes and the upper layer electrode (i), and driving is obtained that achieves high transmittance in comparison to the driving that achieves fast response where driving is performed as mentioned above. It is one of the characteristics of the aforementioned Embodiment that these two kinds of driving can be switched depending on the purpose and situation and, as a result, a wide viewing angle, a fast response, and high transmittance (or a high contrast ratio) can be achieved.

Meanwhile, the liquid crystal display device of the present invention may be one that can perform at least the first drive system.

Embodiments 2-1 to 2-5

Figure 29:
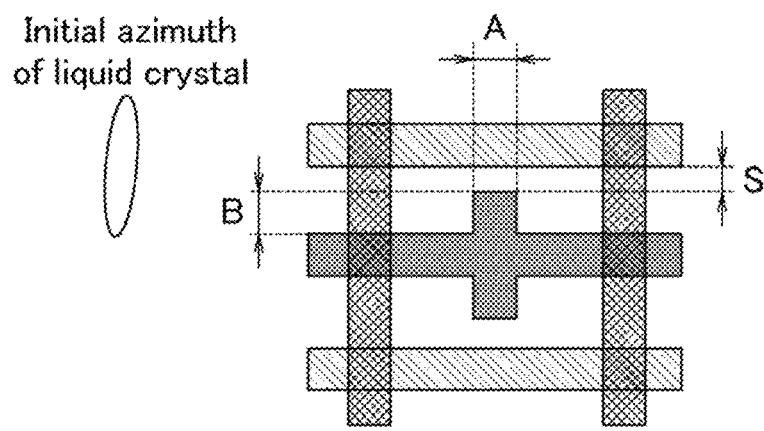
FIG. 29 is a schematic view showing an upper layer electrode (i), a lower layer electrode (ii), and a lower layer electrode (iii) in Embodiments 2-1 to 2-5.

FIG. 29 is a schematic view showing an upper layer electrode (i), a lower layer electrode (ii), and a lower layer electrode (iii) in Embodiments 2-1 to 2-5. In FIG. 29, the width of the electrode, the length of the protruding part, and toe space between the electrodes are denoted by A, B, and S, respectively (respective unit: μm).

Embodiments 2-1 to 2-5 have an electrode structure similar to Embodiment 1, where A, B, and S shown in FIG. 29 are changed as indicated in Table 4. Further, the voltage value of the lower layer electrode in the first drive system was set at a voltage value as low as possible of the voltage values that can provide alignment of the first drive system. Other configurations of the liquid crystal display devices of Embodiments 2-1 to 2-5 are the same as the configuration of the liquid crystal display device of Embodiment 1. For example, in the upper layer electrode (i) in all of Embodiments 2-1 to 2-5, L/S is set equal to 3/6 as with Embodiment 1, and an initial azimuth of the liquid crystal molecules in all of Embodiments 2-1 to 2-5 is set to an azimuth that makes an angle of 3° with the extending direction of the linear sections of the upper layer electrode (i). Meanwhile, A, B, and S of Embodiment 1 are also shown for a reference.

TABLE 4

| | Embodiment 2-1 | Embodiment 2-2 | Embodiment 2-3 | Embodiment 2-4 | Embodiment 2-5 | Embodiment 1 |
|---|---|---|---|---|---|---|
| A | 2.5 | 4 | 2.5 | 2.5 | 2.5 | 3 |
| B | 4 | 4 | 2.5 | 7 | 4 | 4 |
| S | 3 | 3 | 3 | 3 | 5 | 3 |

Comparison of Transmittance of First Drive System and Second Drive System in Embodiments 2-1 to 2-5

Presence or absence of an effect of switching from the first drive system to the second drive system for improving transmittance was examined by calculating voltage-transmittance (V-T) characteristics of the first drive system and the second drive system of Embodiments 2-1 to 2-5 by using LCD Master 3D. In Table 5, there is shown transmittance of Embodiments 2-1 to 2-5 by the first drive system and the second drive system in a white display state. The second drive system shows higher maximum transmittance than the first drive system, suggesting that switching from the first drive system to the second drive system could improve transmittance.

TABLE 5

| | Transmittance (%) | |
|---|---|---|
| | First drive system | Second drive system |
| Embodiment 2-1 | 24.0 | 34.7 |
| Embodiment 2-2 | 21.3 | 34.6 |
| Embodiment 2-3 | 23.3 | 34.7 |
| Embodiment 2-4 | 21.5 | 35.0 |
| Embodiment 2-5 | 23.9 | 31.8 |

Comparison of Response Characteristics and Transmittance of Embodiments 2-1 to 2-5 and Comparative Example 1

Response characteristics and transmittance of Embodiment 2-1 to 2-5 and Comparative Example 1 were compared by calculating response times and transmittance in Embodiments 2-1 to 2-5 and Comparative Example 1 by using LCD Master 3D. As the physical properties of the liquid crystal, values at room temperature were used. In Table 6, response times and transmittance of Embodiments 2-1 to 2-5 and Comparative Example 1 are shown. The items in Table 6 are the same as those mentioned above in Embodiment 1.

TABLE 6

|  | Tr + Td (ms) [1] | Transmittance (%) [2] | Tr + Td (ms)/ Transmittance (%) |
|---|---|---|---|
| Embodiment 2-1 | 21.8 | 34.7 | 0.628 |
| Embodiment 2-2 | 16.8 | 34.6 | 0.485 |
| Embodiment 2-3 | 19.2 | 34.7 | 0.553 |
| Embodiment 2-4 | 17.2 | 35.0 | 0.491 |
| Embodiment 2-5 | 25.7 | 31.8 | 0.807 |
| Comparative Example 1 | 29.8 | 35.0 | 0.861 |

[1] Response times of Embodiments 2-1 to 2-5 are values by the first drive system.
[2] Transmittance of Embodiments 2-1 to 2-5 is a value by the second drive system.

As is shown in Table 6, Embodiments 2-1 to 2-5 have smaller values of (response time)/transmittance than Comparative Example 1 and, therefore, can be said to be better than Comparative Example 1 as driving that can achieve both the fast response and high transmittance.

Comparison of Response Characteristics of Embodiments 2-1 to 2-5 and Comparative Example 2

In Table 7, contrast ratios by the first drive system in Embodiments 2-1 to 2-5 and Comparative Example 2 are shown. The term "CR" in Table 7 refers to the contrast ratio.

TABLE 7

|  | CR |
|---|---|
| Embodiment 2-1 | 597 |
| Embodiment 2-2 | 110 |
| Embodiment 2-3 | 143 |
| Embodiment 2-4 | 110 |
| Embodiment 2-5 | 132 |
| Comparative Example 2 | 107 |

From the results in Table 7, it can be seen that the contrast ratios in Embodiments 2-1 to 2-5 are improved compared to Comparative Example 2.

Effects of the present invention can be obtained more remarkably in respective ranges of: A of 2.5 to 4 µm from Embodiment 2-1 and Embodiment 2-2, for example; B of 2.5 to 7 µm from Embodiment 2-1, Embodiment 2-3, and Embodiment 2-4, for example; and S of 3 to 5 µm from Embodiment 2-1 and Embodiment 2-5, for example. From the viewpoint of improving the contrast ratio, it is especially preferable that A is in a range of 2.5 to 3 µm, B is in a range of 3 to 5 µm, and S is in a range of 3 to 4 µm.

Embodiments 3-1 and 3-2

Figure 30:
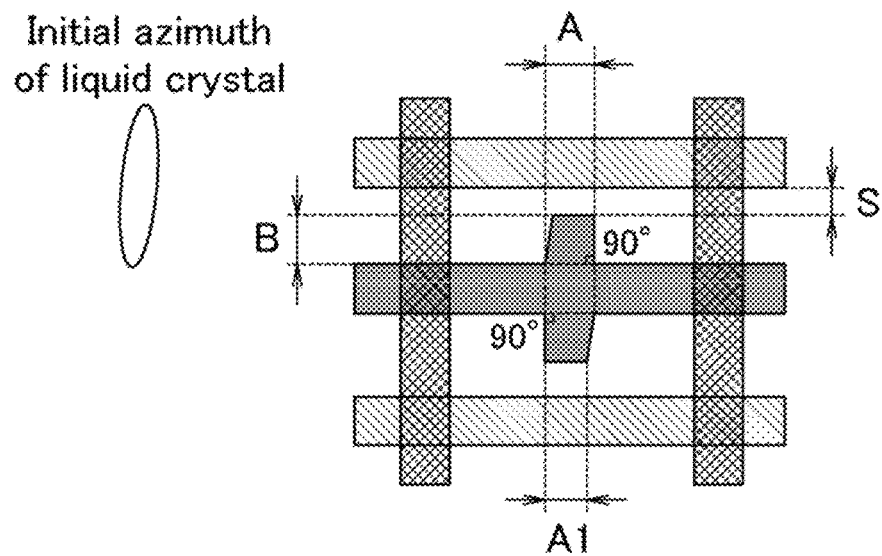
FIG. 30 is a schematic view showing an upper layer electrode (i), a lower layer electrode (ii), and a lower layer electrode (iii), in Embodiments 3-1 and 3-2.

FIG. 30 is a schematic view showing an upper layer electrode (i), a lower layer electrode (ii), and a lower layer electrode (iii) in Embodiments 3-1 and 3-2. Embodiments 3-1 and 3-2 have an electrode structure similar to Embodiment 1, where the shape of the protruding parts is changed. Specifically, as shown in FIG. 30, the shape is such that the end part of each protruding part has become narrower. By this, the contrast ratio can be more improved. As shown in FIG. 30, the width of the root part in the protruding part, the width of the end part, the length of the protruding part, and the space between the electrodes are denoted by A, A1, B, and S, respectively (respective unit: µm).

Embodiments 3-1 and 3-2 have an electrode structure similar to Embodiment 1, where A, A1, B, and S shown in FIG. 30 are changed as indicated in the following Table 8. Further, the voltage value of the lower layer electrode in the first drive system was set at a voltage value as low as possible of the voltage values that can provide alignment of the first drive system. Other configurations of the liquid crystal display devices of Embodiments 3-1 and 3-2 are the same as the configuration of the liquid crystal display device of Embodiment 1. For example, in the upper layer electrode (i) in all of Embodiments 3-1 and 3-2, L/S is set equal to 3/6 as with Embodiment 1, and an initial azimuth of the liquid crystal molecules in all of Embodiments 3-1 and 3-2 is set to an azimuth that makes as angle of 3° with the extending direction of the linear sections of the upper layer electrode (i). Meanwhile, A, A1, B, and S of Embodiment 2-1 are also shown for reference.

TABLE 8

|  | Embodiment 3-1 | Embodiment 3-2 | Embodiment 2-1 |
|---|---|---|---|
| A | 2.5 | 2.5 | 2.5 |
| A1 | 2 | 2 | 2.5 |
| B | 4 | 7 | 4 |
| S | 3 | 3 | 3 |

Comparison of Transmittance of First Drive System and Second Drive System in Embodiments 3-1 and 3-2

Presence or absence of an effect of switching from the first drive system to the second drive system on improving transmittance was examined by calculating voltage-transmittance (V-T) characteristics of the first drive system and the second drive system of Embodiments 3-1 and 3-2 by using LCD Master 3D. In Table 9, there is shown transmittance of Embodiments 3-1 and 3-2 by the first drive system and the second drive system in a white display state. The second drive system shows higher maximum transmittance than the first drive system, suggesting that switching from the first drive system to the second drive system could improve transmittance.

TABLE 9

|  | Transmittance (%) | |
|---|---|---|
|  | First drive system | Second drive system |
| Embodiemnt 3-1 | 24.1 | 33.7 |
| Embodiment 3-2 | 23.8 | 33.7 |

Comparison of Response Characteristics and Transmittance of Embodiments 3-1 and 3-2 and Comparative Example 1

Response characteristics and transmittance of Embodiments 3-1 and 3-2 and Comparative Example 1 were compared by calculating response times and transmittance in Embodiments 3-1 and 3-2 and Comparative Example 1 by using LCD Master 3D. As the physical properties of the liquid crystal, values at room temperature were used. In Table 10, response times and transmittance of Embodiments 3-1 and 3-2 and Comparative Example 1 are shown. The items in Table 10 are the same as those mentioned above in Embodiment 1.

TABLE 10

|  | Tr + Td (ms) [1] | Transmittance (%) [2] | Tr + Td (ms)/ Transmittance (%) |
|---|---|---|---|
| Embodiment 3-1 | 22.9 | 33.7 | 0.680 |
| Embodiment 3-2 | 22.3 | 33.7 | 0.661 |
| Comparative Example 1 | 29.8 | 35.0 | 0.861 |

[1] Response times of Embodiments 3-1 and 3-2 are values by the first drive system.
[2] Transmittance of Embodiments 3-1 and 3-2 is a value by the second drive system.

As is shown in Table 10, Embodiments 3-1 and 3-2 have smaller values of (response time)/transmittance than Comparative Example 1 and, therefore, can be said to be better than Comparative Example 1 as driving that can achieve both the fast response and high transmittance.

Comparison of Response Characteristics of Embodiments 3-1 and 3-2 and Comparative Example 2

In Table 11, contrast ratios by the first drive system. In Embodiments 3-1 and 3-2 and Comparative Example 2 are shown. The term "CR" in Table 11 refers to the contrast ratio.

TABLE 11

|  | CR |
|---|---|
| Embodiment 3-1 | 563 |
| Embodiment 3-2 | 537 |
| Comparative Example 2 | 107 |

From the results of Table 11, it can be seen that the contrast ratios of Embodiments 3-1 and 3-2 are much improved compared to Comparative Example 2.

From Embodiment 1 and Embodiments 3-1 and 3-2, it is preferable that, in the protruding part of the lower layer electrode (iii), the width A1 of the end part is the same as or shorter than the width A of the root part.

It is one of preferable embodiments in the present invention that the protruding part is tilted from the extending direction of the linear sections of the upper layer electrode (i). When tilting the protruding parts, the direction in which the protruding parts are tilted is preferably the same as the initial azimuth of the liquid crystals. In other words, the extending direction of the protruding parts is tilted from the extending direction of the linear sections of the upper layer electrode (i) so as to become parallel to the initial azimuth of the liquid crystals.

Embodiments 4-1 to 4-7

Figure 31:
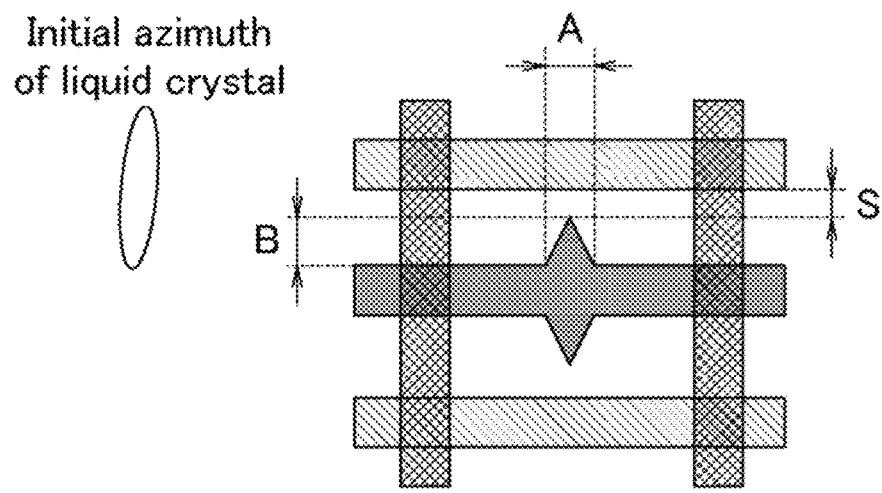
FIG. 31 is a schematic view showing an upper layer electrode (i), a lower layer electrode (ii), and a lower layer electrode (iii) in Embodiments 4-1 to 4-7.

FIG. 31 is a schematic view showing an upper layer electrode (i), a lower layer electrode (ii), and a lower layer electrode (iii) Embodiments 4-1 to 4-7. Embodiments 4-1 to 4-7 have an electrode structure similar to Embodiment 1, where the shape of each protruding part is changed. Specifically, as shown in FIG. 31, the protruding part has a mountain-like structure (triangular shape). As shown in FIG. 31, the width of the root part in the protruding part, the length of the protruding part, and the space between the electrodes are denoted by A, B, and S, respectively (respective unit: μm).

In Embodiments 4-1 to 4-7, the values of A, B, and S in FIG. 31 are set as shown in the following Table 12. Further, the voltage value of the lower layer electrode in the first drive system was set at a voltage value as low as possible of the voltage values that provide alignment of the first drive system. Other configurations of the liquid crystal display devices of Embodiments 4-1 to 4-7 are the same as the configuration of the liquid crystal display device of Embodiment 1. For example, in the upper layer electrode (i) in all of Embodiments 4-1 to 4-7, L/S is set equal to 3/6 as with Embodiment 1, and an azimuth of the liquid crystal in all of Embodiments 4-1 to 4-7 is set to an azimuth that makes an angle of 3° with the extending direction of the linear sections of the upper layer electrode (i).

TABLE 12

|  | Embodiment 4-1 | Embodiment 4-2 | Embodiment 4-3 | Embodiment 4-4 | Embodiment 4-5 | Embodiment 4-6 | Embodiment 4-7 |
|---|---|---|---|---|---|---|---|
| A | 5 | 2 | 9 | 5 | 5 | 5 | 5 |
| B | 2 | 2 | 2 | 1 | 4.5 | 2 | 2 |
| S | 3 | 3 | 3 | 3 | 3 | 1.5 | 4.5 |

Comparison of Transmittance of First Drive System and Second Drive System in Embodiments 4-1 to 4-7

Presence or absence of an effect of switching from the first drive system to the second drive system on improving transmittance was examined by calculating voltage-transmittance (V-T) characteristics of the first drive system and the second drive system of Embodiments 4-1 to 4-7 by using LCD Master 3D. In Table 13, there is shown transmittance of Embodiments 4-1 to 4-7 by the first drive system and the second drive system in a white display state. The second drive system shows higher maximum transmittance that the first drive system, suggesting that transmittance can be improved by switching from the first drive system to the second drive system.

TABLE 13

|  | Transmittance (%) | |
| --- | --- | --- |
|  | First drive system | Second drive system |
| Embodiment 4-1 | 24.3 | 34.2 |
| Embodiment 4-2 | 25.1 | 34.1 |
| Embodiment 4-3 | 23.6 | 34.4 |
| Embodiment 4-4 | 24.6 | 34.5 |
| Embodiment 4-5 | 24.1 | 33.8 |
| Embodiment 4-6 | 23.6 | 35.2 |
| Embodiment 4-7 | 24.1 | 31.5 |

Comparison of Response Characteristics and Transmittance of Embodiments 4-1 to 4-7 and Comparative Example 1

Response characteristics and transmittance of Embodiments 4-1 to 4-7 and Comparative Example 1 were compared by calculating response times and transmittance in Embodiments 4-1 to 4-7 and Comparative Example 1 by using LCD Master 3D. As the physical properties of the liquid crystal, values at room temperature were used. In Table 14, response times and transmittance of Embodiments 4-1 to 4-7 and Comparative Example 1 are shown. The items in Table 14 are the same as those mentioned above in Embodiment 1.

TABLE 14

|  | Tr + Td (ms) [*1] | Transmittance (%) [*2] | Tr + Td (ms)/ Transmittance (%) |
| --- | --- | --- | --- |
| Embodiment 4-1 | 22.7 | 34.2 | 0.665 |
| Embodiment 4-2 | 25.5 | 34.1 | 0.748 |
| Embodiment 4-3 | 23.1 | 34.4 | 0.672 |
| Embodiment 4-4 | 24.6 | 34.5 | 0.713 |
| Embodiment 4-5 | 21.8 | 33.8 | 0.644 |
| Embodiment 4-6 | 21.0 | 35.2 | 0.596 |
| Embodiment 4-7 | 27.1 | 31.5 | 0.859 |
| Comparative Example 1 | 29.8 | 35.0 | 0.861 |

[*1] Response times of Embodiments 4-1 to 4-7 are values by the first drive system.
[*2] Transmittance of Embodiments 4-1 to 4-7 is a value by the second drive system.

As is shown in Table 14, Embodiments 4-1 to 4-7 have smaller values of (response time)/transmittance than in Comparative Example 1 and, therefore, can be said to be better than Comparative Example 1 as driving that can achieve both the fast response and high transmittance.

Comparison of Response Characteristics of Embodiments 4-1 to 4-7 and Comparative Example 2

In Table 15, contrast ratios by the first drive systems in Embodiments 4-1 to 4-7 and Comparative Example 2 are shown. The term "CR" in Table 15 refers to the contrast ratio.

TABLE 15

|  | CR |
| --- | --- |
| Embodiment 4-1 | 161 |
| Embodiment 4-2 | 234 |
| Embodiment 4-3 | 155 |
| Embodiment 4-4 | 301 |
| Embodiment 4-5 | 116 |
| Embodiment 4-6 | 190 |
| Embodiment 4-7 | 185 |
| Comparative Example 2 | 107 |

From the results of Table 15, it can be seen that the contrast ratios in Embodiments 4-1 to 4-7 are much improved compared to Comparative Example 2.

In the case of this mountain-like structure, effects of the present invention can be obtained more remarkably in respective ranges of: A of 2 to 9 µm from Embodiment 4-1 to Embodiment 4-3, for example; B of 1 to 4.5 µm from Embodiment 4-4 and Embodiment 4-5; and S of 1.5 to 4.5 µm from Embodiment 4-6 and Embodiment 4-7. From the viewpoint of improving the contrast ratio, it is more preferable to set A to 5 µm or less. Further, B is more preferably set to 2 µm or less. Furthermore, S is more preferably set to 3 µm or less.

The aforementioned liquid crystal display device of the present invention can perform image display by appropriately switching between the first drive system and the second drive system. Further, in each drive system, display can be performed by appropriately combining white display and black display depending on the desired display.

The liquid crystal display device of the present invention preferably includes a control device that performs the aforementioned first drive system, and more preferably includes a control device that performs driving by switching between the aforementioned first drive system and the second drive system. Hereby, while the contrast ratio at a sufficiently excellent state is maintained, a wide viewing angle as well as a fast response can be achieved, and high transmittance can be achieved. Therefore, with one kind of electrode composition, a liquid crystal display device can be achieved that satisfies all characteristics including fast response, wide viewing angle, high contrast ratio, and high transmittance.

Further, the liquid crystal display device of the present invention preferably includes a control device that automatically switches between the aforementioned first drive system and the second drive system depending on predetermined conditions. The control device is preferably one that has, for example, a temperature sensor mounted and automatically switches between the first drive system and the second drive system depending on temperature. For example, the control device is preferably one that controls the liquid crystal display device so that the second drive system capable of achieving high transmittance is performed under an environment of a temperature (a temperature range where the lower limit is, for example, in the range of −20° C. and 20° C.) where delay in response time is not a problem, and the first drive system capable of achieving fast response is performed under an environment of a low temperature (a temperature range where the upper limit is, for example, in the range of −20° C. and 20° C.) where response time becomes slow. Hereby, a desired effect can be obtained more properly.

Furthermore, the liquid crystal display device of the present invention may also be one that includes a control device that switches between the aforementioned first drive system and the second drive system in response to an instruction of a user.

The present invention may be related to a method for driving a liquid crystal display device by using the aforementioned liquid crystal display device.

Further, when alternating current driving of liquid crystals may be performed, where an alternating current voltage is applied only to electrodes possessed by the lower substrate as with the liquid crystal display device of the present invention, there may be arranged a circuit, a driver, and conductive lines for alternating current drive only on the electrode of the lower substrate as before. Therefore, in comparison to a liquid crystal display device where a circuit, a driver, and conductive lines for alternating current drive are arranged on the upper substrate as well as the lower substrate in order to perform alternating current driving of liquid crystals by applying an alternating current voltage to an electrode possessed by the upper substrate as well as the electrodes possessed by the lower substrate, flexibility in driving of the liquid crystal display device of the present invention is particularly high.

The liquid crystal display device of the present invention includes on-vehicle devices such as car navigation devices, electronic books, photo frames, industrial equipment, televisions, personal computers, smartphones, and tablet terminals. The present invention is preferably applied to devices used both under a high temperature environment and under a low temperature environment such as, for example, on vehicle devices such as a car navigation device.

Meanwhile, the electrode structure, for example, in the lower substrate pertaining to the liquid crystal display device of the present invention can be verified by observation with a microscope such as a scanning electron microscope (SEM).

REFERENCE SIGNS LIST (i): Upper layer electrode
(ii): Lower layer electrode
(iii): Lower layer electrode
(iv): Upper layer electrode
(v): Lower layer electrode
CH: Contact hole
TFT: Thin-film transistor element
SL: Source bus line
GL: Gate bus line
LC: Liquid crystal molecule
10, 1010: Lower substrate
11, 21, 1011, 1021: Glass substrate
13, 1013: Insulating layer
20, 1020: Upper substrate
30, 1030: Liquid crystal layer

The invention claimed is:

1. A liquid crystal display device comprising:
upper and lower substrates; and
a liquid crystal layer interposed between the upper and lower substrates,
the lower substrate including electrodes,
the electrodes including a first electrode, a second electrode present in a different layer from the first electrode, and a third electrode present in a different layer from the first electrode,
the lower substrate including the first electrode, the second electrode, and the third electrode,
the first electrode including a plurality of linear sections,
the second electrode and the third electrode constituting a pair of comb electrodes,
each of the comb electrodes including a trunk part and a plurality of branch parts diverging from the trunk part,
at least one of the plurality of branch parts of the third electrode including a protruding part that make the branch part partially wide, between two intersections with a plurality of linear sections of the first electrode in a plan view of the lower substrate,
at least two of the plurality of branch parts of the second electrode including no protruding part that makes the branch part partially wide, between two intersections with the plurality of linear sections of the first electrode,
the at least two branch parts of the second electrode including no protruding part and the at least one branch part of the third electrode including the protruding part being arranged alternately in an extending direction of the plurality of linear sections of the first electrode,
the liquid crystal layer containing liquid crystal molecules that, when no voltage is applied, align in parallel with main surfaces of the upper and lower substrates.

2. The liquid crystal display device according to claim 1, wherein the protruding part makes an angle of 20° to 90° with an extending direction of the branch parts of the third electrode.

3. The liquid crystal display device according to claim 1, wherein each branch part of the third electrode contains a cross-shaped section.

4. The liquid crystal display device according to claim 3, wherein the first electrode either is provided with a slit or is a comb electrode; and
an intersecting part of the cross-shaped section of each branch part of the third electrode is arranged at the center of an area surrounded by the first electrode and the second electrode in a plan view of the lower substrate.

5. The liquid crystal display device according to claim 1, wherein the liquid crystal display device is configured to perform a first drive operation utilizing an electric field generated by any of the electrodes provided to the lower substrate, the electric field rotating a first group of the liquid crystal molecules in a plane parallel to the main surfaces of the upper and lower substrates and rotating a second group of the liquid crystal molecules in the plane parallel to the main surfaces in a direction opposite to the rotation direction of the first group of the liquid crystal molecules.

6. The liquid crystal display device according to claim 5, wherein the first drive operation utilizes an electric field generated by any of the electrodes provided to the lower substrate, the electric field rotating the liquid crystal molecules in a sub-pixel so that first and second regions are formed alternately, the first region containing the first group of the liquid crystal molecules rotated in the plane parallel to the main surfaces, the second region containing the second group of the liquid crystal molecules rotated in the plane parallel to the main surfaces in the direction opposite to the rotation direction of the first group of the liquid crystal molecules.

7. The liquid crystal display device according to claim 5, which is configured to switch between
a first drive system that performs the first drive operation and
a second drive system that performs a second drive operation utilizing an electric field generated by any of the electrodes, the electric field rotating the liquid crystal molecules in the plane parallel to the main surfaces of the upper and lower substrates in one direction.

8. The liquid crystal display device according to claim 1, wherein the first electrode is arranged at a position closer to the liquid crystal layer than the second electrode and the third electrode.

9. The liquid crystal display device according to claim 1, wherein the liquid crystal molecules have positive anisotropy of dielectric constant.

10. The liquid crystal display device according to claim 1, wherein the lower substrate is provided with a thin-film transistor element, and
the thin-film transistor element contains an oxide semiconductor.

11. The liquid crystal display device according to claim 1, wherein the plane shape of the protruding part is a rectangular shape.

* * * * *